(12) United States Patent
Sepahpour et al.

(10) Patent No.: US 12,584,545 B2
(45) Date of Patent: Mar. 24, 2026

(54) DISPLAY UNIT WITH DRIVE MECHANISM

(71) Applicants:Bijan Sepahpour, Pennington, NJ
(US); Tyler Fedorko, Cinnaminson, NJ
(US); Nicolas Moriello, Old Bridge, NJ
(US); Reid Carrico, Indianapolis, IN
(US)

(72) Inventors: Bijan Sepahpour, Pennington, NJ
(US); Tyler Fedorko, Cinnaminson, NJ
(US); Nicolas Moriello, Old Bridge, NJ
(US); Reid Carrico, Indianapolis, IN
(US)

( * ) Notice: Subject to any disclaimer, the term of this
patent is extended or adjusted under 35
U.S.C. 154(b) by 121 days.

(21) Appl. No.: 18/648,378

(22) Filed: Apr. 28, 2024

(65) Prior Publication Data

US 2025/0334172 A1 Oct. 30, 2025

(51) Int. Cl.
*A47F 5/025* (2006.01)
*A47F 3/08* (2006.01)
*F16H 29/12* (2006.01)
(52) U.S. Cl.
CPC .............. *F16H 29/12* (2013.01); *A47F 3/08*
(2013.01); *A47F 5/025* (2013.01)
(58) Field of Classification Search
CPC ....................................................... F16H 29/12
See application file for complete search history.

(56) References Cited

U.S. PATENT DOCUMENTS

| | | | | |
|---|---|---|---|---|
| 5,567,026 | A | 10/1996 | Lacewell | |
| D392,819 | S | 3/1998 | Woodward | |
| 6,309,034 | B1 * | 10/2001 | Credle, Jr. | A47F 3/08 |
| | | | | 312/305 |
| 6,883,887 | B1 * | 4/2005 | Mogensen | A47B 49/004 |
| | | | | 312/305 |
| 9,022,236 | B1 * | 5/2015 | Amendolea | B65G 1/045 |
| | | | | 211/144 |
| D927,903 | S | 8/2021 | Park | |
| 11,980,145 | B2 * | 5/2024 | Allgeier | A01G 9/00 |
| 2020/0160463 | A1 | 5/2020 | He | |

* cited by examiner

*Primary Examiner* — Vicky A Johnson
(74) *Attorney, Agent, or Firm* — Kattina V. Barsik, Esq.

(57) ABSTRACT

A drive mechanism (106) having a motor unit (202), a
primary shaft (204), a drive piece (224), and a plurality of
plates (212). The motor unit (202) generates a rotational
force to rotate a motor shaft (304) that thereby rotates the
primary shaft (204), which rotates the drive piece (224). The
drive piece (224) includes a plurality of pins (506) that
revolve around the primary shaft (204). Each of the plurality
of plates (212) includes a plurality of channels (402) such
that each of the plurality of pins (506), upon revolution,
intermittently engages with each channel of the plurality of
channels (402) of each of the plurality of plates (212). Each
of the plurality of plates (212) exhibits rotation upon an
intermittent engagement of a pin of the plurality of pins
(506) with a channel of the plurality of channels (402) of
respective plate of the plurality of plates (212).

20 Claims, 27 Drawing Sheets

100

110

102

108n

108a

104d

104a

106

112

103

105

114a

114b

114n $210 \left[\begin{matrix} 210a \\ 210n \end{matrix}\right.$    $216 \left[\begin{matrix} 216a \\ 216n \end{matrix}\right.$    $218 \left[\begin{matrix} 218a \\ 218n \end{matrix}\right.$    $220 \left[\begin{matrix} 220a \\ 220n \end{matrix}\right.$    $222 \left[\begin{matrix} 222a \\ 222n \end{matrix}\right.$ 234 ⎰ 234a
    ⎱ 234d

106

230

234d

234a

232

212a

404a

502

402a

506

404a

402a

502

506

504a

404a

402a

504b

616

602

604a

616

604b

604a

602

618

604a

602

704

710n

710a

708

DISPLAY UNIT WITH DRIVE MECHANISM

TECHNICAL FIELD

The present disclosure relates generally to the field of showcases and display devices to showcase or display various articles. More particularly, the present disclosure relates to a display unit with a drive mechanism.

BACKGROUND

In the realm of displaying valuable items through display cases, traditional methods of displaying the valuable items such as merchandise, trophies, awards, memorabilia, or artwork etc. faced notable challenges. Display cases have traditionally been used to showcase valuables, but they have limitations. They're often static and inflexible, making it difficult to change or rotate items. The static nature of conventional display cases, which limited the ability to rotate or reposition items dynamically. This static presentation inhibited the comprehensive exhibition of three-dimensional objects, intricate artworks, and diverse collections. The viewers are confined to a single perspective, impeding their ability to engage fully with the showcased items and appreciate their intricate details from different angles. This is a problem for 3D objects, artwork, and collections that need to be displayed dynamically. Visitors can only see these items from one angle, which limits their understanding and enjoyment of the details and depth.

Moreover, the traditional display cases displayed less than ideal spatial efficiency due to their fixed-shelf structure. The incapacity to rearrange items led to inefficiencies, resulting in unutilized space and a decrease in the overall aesthetic appeal of the exhibit. The inflexibility in shelf arrangements posed challenges for curators, limiting their ability to fully utilize the display area and exhibit a greater number of items within the same space. The fixed shelf structure also causes inability to rearrange items within these cases that results in operational inefficiencies, manifesting as notable underutilized space and a palpable decline in the overall aesthetic allure of the exhibit. As a consequence, the potential to showcase a more extensive array of items within the same space was curtailed, impacting the overall richness and diversity of the exhibited collection.

Hence, there may be a need to develop an efficient display device that is capable of solving aforementioned problems.

SUMMARY

In view of the foregoing, a drive mechanism is disclosed. The drive mechanism includes a motor unit having a motor shaft such that the motor unit generates a rotational force to rotate the motor shaft. The drive mechanism further includes a primary shaft that is coupled to the motor unit. The primary shaft extends along a longitudinal axis of the drive mechanism such that the primary shaft rotates upon rotation of the motor shaft. The drive mechanism further includes a drive piece that is coupled to the primary shaft such that the drive piece rotates upon rotation of the primary shaft. The drive piece includes a plurality of pins disposed on a surface of the drive piece. Each pin of the plurality of pins extends in a direction of the longitudinal axis. The plurality of pins revolves around the primary shaft upon rotation of the drive piece. The plurality of pins are disposed on a plurality of locations of the surface of the drive piece to facilitate different combinations of revolutions of the plurality of pins around the primary shaft. The drive mechanism further includes a plurality of plates disposed around the primary shaft. Each plate of the plurality of plates includes a plurality of channels formed on a surface of each plate of the plurality of plates. Each pin of the plurality of pins, upon revolution, intermittently engages with each channel of the plurality of channels of each plate of the plurality of plates. Each plate of the plurality of plates exhibits rotation upon an intermittent engagement of a pin of the plurality of pins with a channel of the plurality of channels of respective plate of the plurality of plates.

In some embodiments of the present disclosure, the drive mechanism further includes a plurality of secondary shafts that are disposed around the primary shaft. The plurality of secondary shafts extends along the longitudinal axis such that each plate of the plurality of plates is coupled to at least one shaft of the plurality of secondary shafts. Each secondary shaft of the plurality of secondary shafts is adapted to rotate upon rotation of corresponding plate of the plurality of plates.

In some embodiments of the present disclosure, the motor unit further includes a drive sprocket coupled to the motor shaft such that the drive sprocket rotates upon rotation of the motor shaft.

In some embodiments of the present disclosure, the drive mechanism further includes a primary sprocket coupled to the primary shaft. The drive mechanism further includes a primary chain drivingly wrapped around the drive sprocket and the primary sprocket such that the primary chain transmits the rotational force from the motor shaft to the primary shaft to rotate the primary shaft.

In some embodiments of the present disclosure, the drive mechanism further includes a plurality of secondary sprockets such that each secondary sprocket of the plurality of secondary sprockets is coupled to corresponding secondary shaft of the plurality of secondary shafts.

In some embodiments of the present disclosure, each secondary sprocket of the plurality of secondary sprockets is adapted to rotate upon rotation of corresponding secondary shaft of the plurality of secondary shafts.

In some embodiments of the present disclosure, the drive mechanism further includes a plurality of rods such that each rod of the plurality of rods extends along the longitudinal axis and arranged in a parallel configuration with the primary shaft and the plurality of secondary shafts.

In some embodiments of the present disclosure, the drive mechanism further includes a plurality of rod sprockets. Each rod sprocket of the plurality of rod sprockets is coupled to corresponding rod of the plurality of rods. The drive mechanism further includes a plurality of secondary chains. Each secondary chain of the plurality of secondary chains is wrapped around corresponding pair of the secondary sprocket of the plurality of secondary sprockets and the rod sprocket of the plurality of rod sprockets.

In some embodiments of the present disclosure, each secondary chain of the plurality of secondary chains facilitates rotation of a rod of the plurality of rods upon rotation of corresponding secondary sprocket of the plurality of secondary sprockets.

In some embodiments of the present disclosure, the drive mechanism further includes a plurality of rod bearings such that each rod bearing of the plurality of rod bearings is coupled to the corresponding rod of the plurality of rods. Each rod bearing of the plurality of rod bearings facilitates rotation of corresponding rod of the plurality of rods.

In some aspects of the present disclosure, a display unit is disclosed. The display unit includes a drive mechanism that facilitates intermittent rotation of articles in the display unit. The drive mechanism includes a motor unit having a motor shaft such that the motor unit generates a rotational force to rotate the motor shaft. The drive mechanism further includes a primary shaft that is coupled to the motor unit. The primary shaft extends along a longitudinal axis of the drive mechanism such that the primary shaft rotates upon rotation of the motor shaft. The drive mechanism further includes a drive piece that is coupled to the primary shaft such that the drive piece rotates upon rotation of the primary shaft. The drive piece includes a plurality of pins disposed on a surface of the drive piece. Each pin of the plurality of pins extends in a direction of the longitudinal axis. The plurality of pins revolves around the primary shaft upon rotation of the drive piece. The plurality of pins are disposed on a plurality of locations of the surface of the drive piece to facilitate different combinations of revolutions of the plurality of pins around the primary shaft. The drive mechanism further includes a plurality of plates disposed around the primary shaft. Each plate of the plurality of plates includes a plurality of channels formed on a surface of each plate of the plurality of plates. Each pin of the plurality of pins, upon revolution, intermittently engages with each channel of the plurality of channels of each plate of the plurality of plates. Each plate of the plurality of plates exhibits rotation upon an intermittent engagement of a pin of the plurality of pins with a channel of the plurality of channels of respective plate of the plurality of plates.

In some embodiments of the present disclosure, the drive mechanism of the display unit further includes a plurality of secondary shafts that are disposed around the primary shaft. The plurality of secondary shafts extends along the longitudinal axis such that each plate of the plurality of plates is coupled to at least one shaft of the plurality of secondary shafts. Each secondary shaft of the plurality of secondary shafts is adapted to rotate upon rotation of corresponding plate of the plurality of plates.

In some embodiments of the present disclosure, the motor unit further includes a drive sprocket coupled to the motor shaft such that the drive sprocket rotates upon rotation of the motor shaft.

In some embodiments of the present disclosure, the drive mechanism of the display unit further includes a primary sprocket coupled to the primary shaft. The drive mechanism further includes a primary chain drivingly wrapped around the drive sprocket and the primary sprocket such that the primary chain transmits the rotational force from the motor shaft to the primary shaft to rotate the primary shaft.

In some embodiments of the present disclosure, the drive mechanism of the display unit further includes a plurality of secondary sprockets such that each secondary sprocket of the plurality of secondary sprockets is coupled to corresponding secondary shaft of the plurality of secondary shafts.

In some embodiments of the present disclosure, each secondary sprocket of the plurality of secondary sprockets is adapted to rotate upon rotation of corresponding secondary shaft of the plurality of secondary shafts.

In some embodiments of the present disclosure, the drive mechanism of the display unit further includes a plurality of rods such that each rod of the plurality of rods extends along the longitudinal axis and arranged in a parallel configuration with the primary shaft and the plurality of secondary shafts.

In some embodiments of the present disclosure, the drive mechanism of the display unit further includes a plurality of rod sprockets. Each rod sprocket of the plurality of rod sprockets is coupled to corresponding rod of the plurality of rods. The drive mechanism further includes a plurality of secondary chains. Each secondary chain of the plurality of secondary chains is wrapped around corresponding pair of the secondary sprocket of the plurality of secondary sprockets and the rod sprocket of the plurality of rod sprockets.

In some embodiments of the present disclosure, each secondary chain of the plurality of secondary chains facilitates rotation of a rod of the plurality of rods upon rotation of corresponding secondary sprocket of the plurality of secondary sprockets.

In some embodiments of the present disclosure, the drive mechanism of the display unit further includes a plurality of rod bearings such that each rod bearing of the plurality of rod bearings is coupled to the corresponding rod of the plurality of rods. Each rod bearing of the plurality of rod bearings facilitates rotation of corresponding rod of the plurality of rods.

BRIEF DESCRIPTION OF DRAWINGS

The above and still further features and advantages of aspects of the present disclosure becomes apparent upon consideration of the following detailed description of aspects thereof, especially when taken in conjunction with the accompanying drawings, and wherein:

FIG. 6 illustrates a perspective view of a first rod carrying bases, in accordance with an embodiment of the present disclosure;

To facilitate understanding, like reference numerals have been used, where possible, to designate like elements common to the figures.

DETAILED DESCRIPTION

Figure 1A:
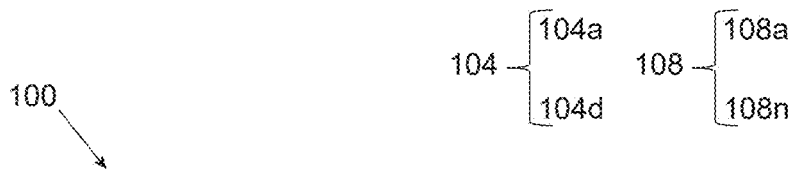
FIG. 1A illustrates a front view of a display unit, in accordance with an embodiment of the present disclosure.
Figure 1A:
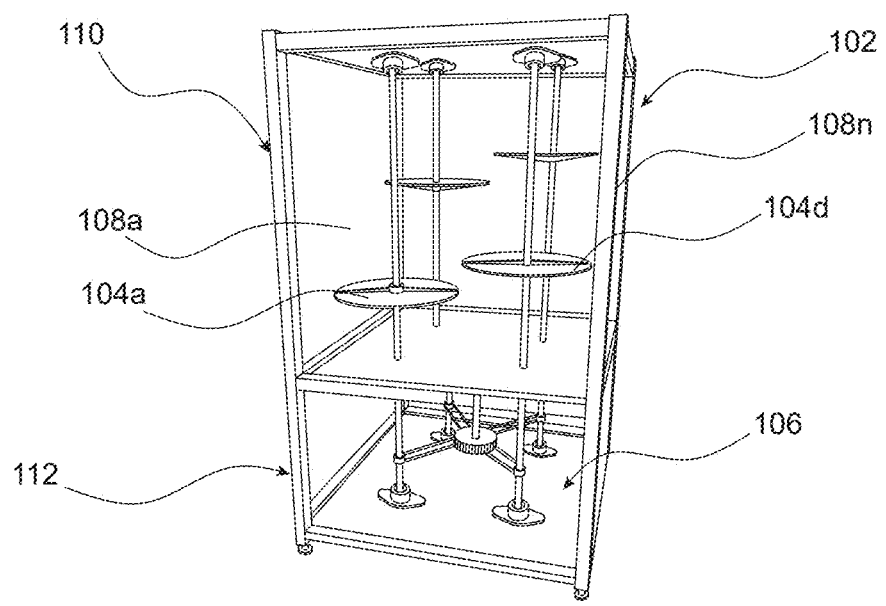

Various aspects of the present disclosure provide a display unit with drive mechanism. The following description provides specific details of certain aspects of the disclosure illustrated in the drawings to provide a thorough understanding of those aspects. It should be recognized, however, that the present disclosure can be reflected in additional aspects and the disclosure may be practiced without some of the details in the following description.

The various aspects including the example aspects are now described more fully with reference to the accompanying drawings, in which the various aspects of the disclosure are shown. The disclosure may, however, be embodied in different forms and should not be construed as limited to the aspects set forth herein. Rather, these aspects are provided so that this disclosure is thorough and complete, and fully conveys the scope of the disclosure to those skilled in the art. In the drawings, the sizes of components may be exaggerated for clarity.

It is understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

The subject matter of example aspects, as disclosed herein, is described specifically to meet statutory requirements. However, the description itself is not intended to limit the scope of this disclosure. Rather, the inventor/inventors have contemplated that the claimed subject matter might also be embodied in other ways, to include different features or combinations of features similar to the ones described in this document, in conjunction with other technologies. Generally, the various aspects including the example aspects relate to a display unit with drive mechanism.

As mentioned, there remains a need for an efficient display unit to maximize viewing of articles. Accordingly, the present disclosure provides the display unit that causes intermittent rotation of the articles for maximizing viewing of the articles. Specifically, the display unit of the present disclosure employs a driving mechanism that facilitates intermittent rotation of the articles which results in better viewing experience of the articles. Eventually, the driving mechanism, by causing intermittent rotation of the articles, facilitates viewers to capture intricate details (three dimensionally) of the articles.

FIG. 1A illustrates a front view of a display unit 100, in accordance with an embodiment of the present disclosure. The display unit 100 may be adapted to show or display a plurality of articles (hereinafter referred to as "the articles) to a viewer. The display unit 100 may advantageously facilitate maximum view for the plurality of articles without hiding any of the article of the articles. In some embodiments of the present disclosure, the display unit 100 may be provided with a plurality of castor wheels that may facilitate easy maneuvering of the display unit 100 from one place to another.

In some embodiments of the present disclosure, the display unit 100 may be made up of a material that may have a high strength to weight ratio (S/W) that may advantageously prevent buckling and excessive deflection/deformations in the display unit 100.

In some embodiments of the present disclosure, the display unit 100 may be made up of a material including, but not limited to, plastic, aluminium, steel, stainless steel, high strength polypropylene, and the like. Embodiments of the present disclosure are intended to include and/or otherwise cover any type of known and later developed materials for the display unit 100, without deviating from the scope of the present disclosure.

In some embodiments of the present disclosure, the display unit 100 may have a footprint dimension that may be in a range of 1 square foot to 100 square feet. Embodiments of the present disclosure are intended to include and/or otherwise cover any value/range of the footprint dimension of the display unit 100, without deviating from the scope of the present disclosure.

The display unit 100 may include a cabinet 102, a plurality of bases 104a-104d (hereinafter collectively referred to and designated as "the bases 104"), and a drive mechanism 106.

In some embodiments of the present disclosure, each base of the bases 104 may have cross sectional shape that may be one of, a circular shape, a square shape, a triangular shape, a rectangular shape, and the like. Embodiments of the present disclosure are intended to include and/or otherwise cover any type of shape for each base of the bases 104, without deviating from the scope of the present disclosure.

In some embodiments of the present disclosure, each base of the bases 104 may have a dimension that may be in a range of 0.25 foot to 5 feet. Embodiments of the present disclosure are intended to include and/or otherwise cover any dimension value/range for the bases 104 depending on dimension of the display unit 100, without deviating from the scope of the present disclosure.

The cabinet 102 may include a plurality of walls 108a-108n (hereinafter collectively referred to and designated as "the walls 108"), an upper portion 110, and a lower portion 112. The walls 108 may extend along the upper portion 110. Specifically, the first wall 108a may extend along the upper portion 110 at a first side of the cabinet 102. The second wall 108b may extend along the upper portion 110 at a second side of the cabinet 102. The third wall 108c may extend along the upper portion 110 at a third side of the cabinet 102. The fourth wall 108d may extend along the upper portion 110 at a fourth side of the cabinet 102. Embodiments of the present disclosure are intended to include and/or otherwise cover any number of walls that may extend along the upper portion 110 at any number of sides of the cabinet 102, without deviating from the scope of the present disclosure.

In some embodiments of the present disclosure, each wall of the walls 108 may be made up of a material including, but not limited to, a glass, a plexiglass, a polymethyl methacrylate (PMMA), and the like. Embodiments of the present disclosure are intended to include and/or otherwise cover any type of known and later developed materials, without deviating from the scope of the present disclosure.

The upper portion 110 may be disposed at an upper side of the cabinet 102. The bases 104 may be disposed at the upper portion 110. The bases 104 may be adapted to hold the articles such that the articles are displayed or showed to the viewer. Each base of the bases 104 may be disposed or arranged at different vertical heights in the upper portion 110. This facilitates a better view for the articles. The bases 104 may be adapted to rotate. Specifically, each base of the bases 104 may be adapted to intermittently rotate such that the articles are clearly visible to the viewer. In other words, the intermittent rotation of each base of the bases 104 may advantageously facilitate the viewer to view the articles without hiding any article of the articles. The viewer may therefore have a sufficient time to view the articles.

In some embodiments of the present disclosure, the upper portion 110 may have a length that may be in a range of 0.5 foot to 12 feet. Embodiments of the present disclosure are intended to include and/or otherwise cover any dimension value/range for the upper portion 110 depending on dimension of the display unit 100, without deviating from the scope of the present disclosure.

The lower portion 112 may be disposed at a lower side of the cabinet 102. The lower portion 112 may be adapted to accommodate the drive mechanism 106. In other words, the drive mechanism 106 may be held inside the lower portion 112. The drive mechanism 106 may be adapted to rotate the bases 104. Specifically, the drive mechanism 106 may be adapted to intermittently rotate the bases 104.

In some embodiments of the present disclosure, the lower portion 112 may have a length that may be in a range of 0.25 foot to 4 feet. Embodiments of the present disclosure are intended to include and/or otherwise cover any dimension value/range for the lower portion 112 depending on dimension of the display unit 100, without deviating from the scope of the present disclosure.

Figure 1B:
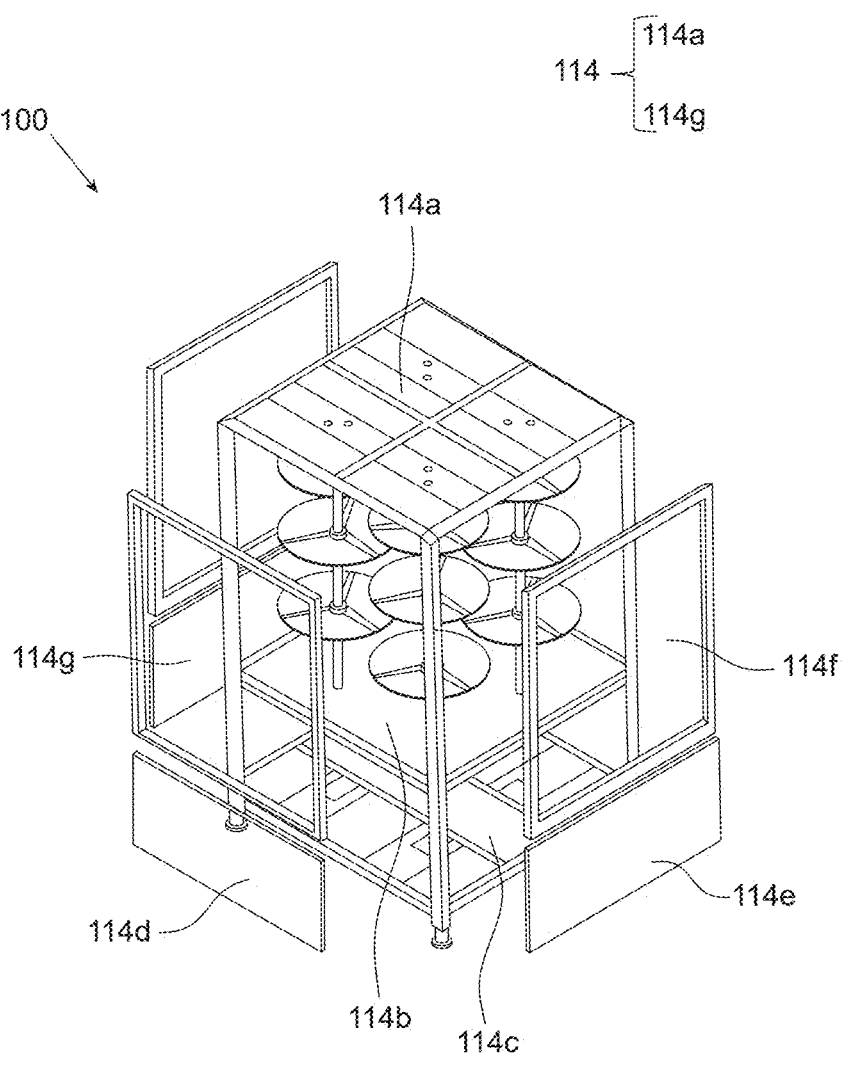
FIG. 1B illustrates a perspective exploded view of the display unit, in accordance with an embodiment of the present disclosure.

FIG. 1B illustrates a perspective exploded view of the display unit 100, in accordance with an embodiment of the present disclosure. The cabinet 102 may further include a plurality of panels 114a-114n (hereinafter collectively referred to and designated as "the panels 114"). The first panel 114a may be disposed at a top surface of the cabinet 102. Specifically, the first panel 114a may be disposed at the top surface of the upper portion 110 of the cabinet 102. The second panel 114b may be disposed beneath the first panel 114a and in a parallel configuration to the first panel 114a. The second panel 114b may be disposed at a bottom surface of the cabinet 102. Specifically, the second panel 114b may be disposed at the bottom surface of the upper portion 110 of the cabinet 102. The third panel 114c may be disposed beneath the first and second panels 114a, 114b and in a parallel configuration to the first and second panels 114a, 114b. Specifically, the third panel 114b may be disposed at a bottom surface of the lower portion 112 of the cabinet 102.

The fourth through seventh panels 114d-114g may be disposed at sides of the lower portion 112. Specifically, the fourth panel 114d may be disposed at a first side of the lower portion 112 such that the fourth panel 114d covers the first side of the lower portion 112. The fifth panel 114d may be disposed at a second side of the lower portion 112 such that the fifth panel 114d covers the second side of the lower portion 112. The sixth panel 114e may be disposed at a third side of the lower portion 112 such that the sixth panel 114e covers the third side of the lower portion 112. The seventh panel 114f may be disposed at a fourth side of the lower portion 112 such that the seventh panel 114f covers the fourth side of the lower portion 112. Embodiments of the present disclosure are intended to include and/or otherwise cover any number of panels that may be disposed at any number of sides of the lower portion 112 to cover various sides of the lower portion 112, without deviating from the scope of the present disclosure.

Figure 1C:
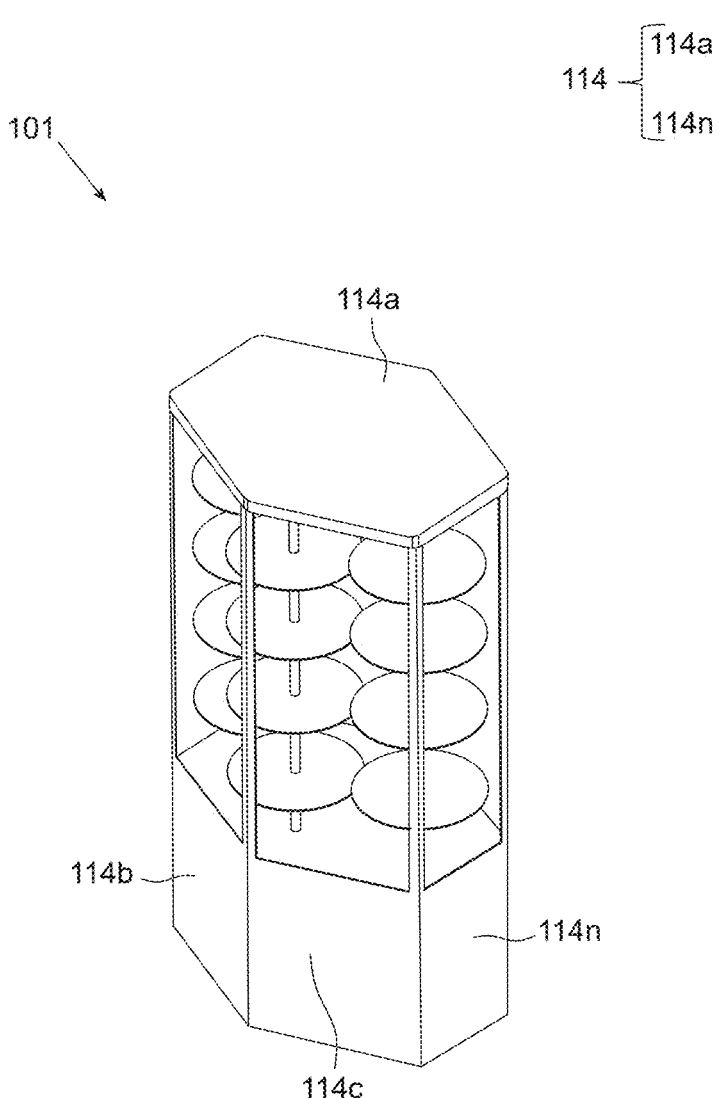
FIG. 1C illustrates a perspective view of another display unit having an irregular hexagonal shape, in accordance with an embodiment of the present disclosure.

FIG. 1C illustrates a perspective view of another display unit 101 having an irregular hexagonal shape, in accordance with an embodiment of the present disclosure. Specifically, cross-sectional shape of the panels 114 of the display unit 101 may have the irregular hexagonal shape.

In some embodiments of the display unit 101 may have a length that may be in a range of 0.5 foot to 15 feet. Embodiments of the present disclosure are intended to include and/or otherwise cover any dimension value/range for the display unit 101, without deviating from the scope of the present disclosure.

Figure 1D:
FIG. 1D illustrates a perspective view of another display unit having a regular hexagonal shape, in accordance with an embodiment of the present disclosure.
Figure 1D:
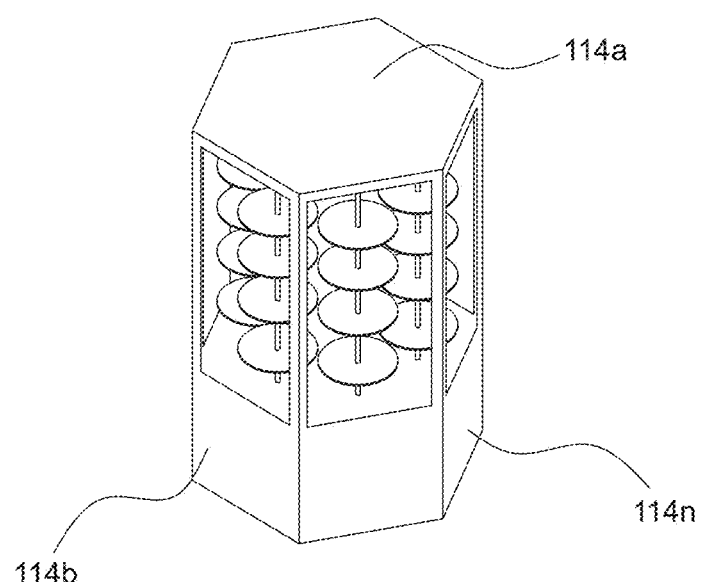

FIG. 1D illustrates a perspective view of another display unit 103 having a regular hexagonal shape, in accordance with an embodiment of the present disclosure. Specifically, cross-sectional shape of the panels 114 of the display unit 103 may have the regular hexagonal shape.

Figure 1E:
FIG. 1E illustrates a perspective view of another display unit having a square shape, in accordance with an embodiment of the present disclosure.
Figure 1E:
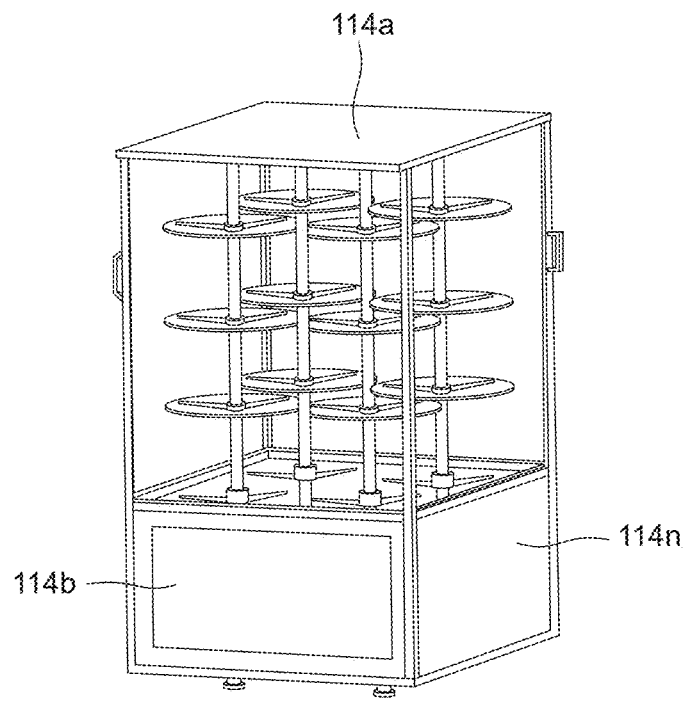

FIG. 1E illustrates a perspective view of another display unit 105 having a square shape, in accordance with an embodiment of the present disclosure. Specifically, cross-sectional shape of the panels 114 of the display unit 105 may have the square shape Embodiments of the present disclosure are intended to include and/or otherwise cover any other cross-sectional shape of the panels 114 of the display units 100, 101, 103, and 105. The display units 101, 103, and 105 may be structurally, functionally, and configurationally same or substantially similar to the display unit 100 as explained hereinabove, without deviating from the scope of the present disclosure.

Figure 2A:
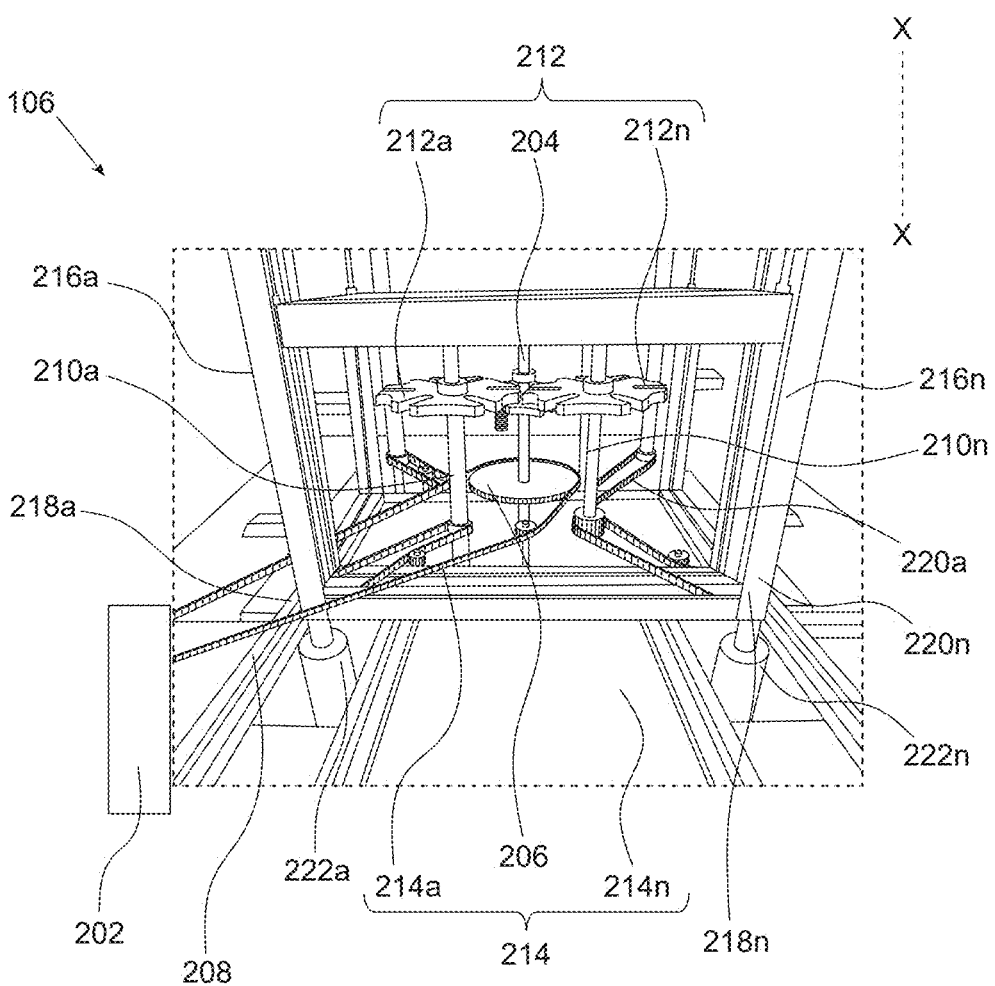
FIG. 2A illustrates a front view of the drive mechanism, in accordance with an embodiment of the present disclosure.

FIG. 2A illustrates a front view of the drive mechanism 106 (hereinafter interchangeably referred to and designated as "the driving mechanism 106"), in accordance with an embodiment of the present disclosure. The drive mechanism 106 may include a motor unit 202, a primary shaft 204, a primary sprocket 206, a primary chain 208, a plurality of secondary shafts 210a-210n (hereinafter collectively referred to and designated as "the secondary shafts 210"), a plurality of plates 212a-212n (hereinafter collectively referred to and designated as "the plates 212"), a plurality of secondary sprockets 214a-214n (hereinafter collectively referred to and designated as "the secondary sprockets 214"), a plurality of rods 216a-216n (hereinafter collectively referred to and designated as "the rods 216"), a plurality of rod sprockets 218a-218n (hereinafter collectively referred to and designated as "the rod sprockets 218"), a plurality of secondary chains 220a-220n (hereinafter collectively referred to and designated as "the secondary chains 220"), and a plurality of rod bearings 222a-222n (hereinafter collectively referred to and designated as "the rod bearings 222").

Figure 2B:
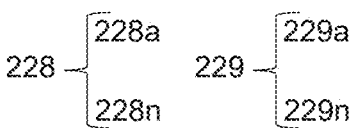
FIG. 2B illustrates a perspective exploded view of the drive mechanism, in accordance with an embodiment of the present disclosure.
Figure 2B:
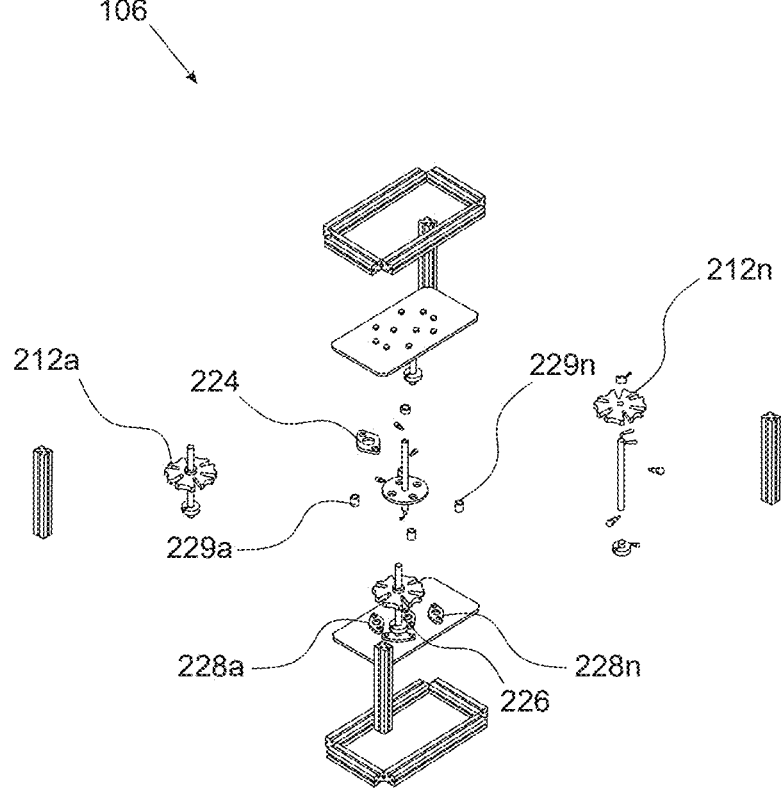

FIG. 2B illustrates a perspective exploded view of the drive mechanism 106, in accordance with an embodiment of the present disclosure. The exploded view may represent a detailed view of the components of the drive mechanism 106. The drive mechanism 106 may further include a drive piece 224, a primary bearing 226, a plurality of secondary bearings 228a-228n (hereinafter collectively referred to and designated as "the secondary bearings 228"), and a plurality of fasteners 229a-229n (hereinafter collectively referred to and designated as "the fasteners 229").

The motor unit 202 may be adapted to generate a rotational force. The motor unit 202 may be adapted to rotate a component of the drive mechanism 106. Specifically, the motor unit 202 may be adapted to rotate the component of the drive mechanism 106 upon generation of the rotational force.

The primary shaft 204 may extend along a longitudinal axis (X-X) of the drive mechanism 106. The primary shaft 204 may be coupled to the motor unit 202. The primary sprocket 206 may be coupled to the primary shaft 204. The primary sprocket 206 may include a through hole that may be disposed at the center of the primary sprocket 206. To couple the primary sprocket 206, the primary shaft 204 may be inserted into the through hole of the primary sprocket 206. The motor unit 202 may be coupled to the primary shaft 204. Specifically, the motor unit 202 may be coupled to the primary sprocket 206.

The primary chain 208 may be wrapped around the motor unit 202 and the primary sprocket 206. Specifically, the primary chain 208 may be wrapped around a component of the motor unit 202 and the primary sprocket 206 (as explained later in detail in FIG. 3). Thus, the primary chain 208 may facilitate the motor unit 202 to drivingly couple with the primary sprocket 206. The primary chain 208 may further facilitate to transmit the rotational force that may be generated by the motor unit 202 to the primary sprocket 206. Since, the primary sprocket 206 is fixedly coupled to the primary shaft 204, therefore, the primary sprocket 206, upon rotation, may facilitate rotation of the primary shaft 204.

The primary bearing 226 may be mounted on the third panel 114c. The primary bearing 226 may be disposed at an end of the primary shaft 204. In other words, the end of the primary shaft 204 may be inserted inside the primary bearing 226. The primary bearing 226 may therefore facilitate rotation of the primary shaft 204. Specifically, a rotating element of the primary bearing 226 may facilitate rotation of the primary shaft 204.

In some embodiments of the present disclosure, there may be more than one primary bearing i.e., 2 primary bearings. In such a scenario, each of the primary bearings may be disposed at either ends of the primary shaft 204 such that both the primary bearings facilitate rotation of the primary shaft 204.

The drive piece 224 may be coupled to the primary shaft 204. The drive piece 224 may include a through hole that may be disposed at the center of the drive piece 224. To couple the drive piece 224 with the primary shaft 204, the primary shaft 204 may be inserted into the through hole of the drive piece 224. Since, the drive piece 224 is fixedly connected to the primary shaft 204, therefore, the drive piece 224 rotates upon rotation of the primary shaft 204. The secondary shafts 210 may be disposed around the primary shaft 204. The secondary shafts 210 may extend along the longitudinal axis (X-X) of the driving mechanism 106. The plates 212 may be coupled to the secondary shafts 210. Specifically, each plate of the plates 212 may be coupled to corresponding secondary shaft of the secondary shafts 210. Each plate of the plates 212 may include a through hole that may be disposed at the center of the plate. To couple each plate of the plates 212 with corresponding secondary shaft of the secondary shafts 210, the corresponding secondary shaft may be inserted into the through hole of that plate. The plates 212 may further be coupled to the drive piece 224. Specifically, the plates 212 may be coupled to a component of the drive piece 224 such that the drive piece 224, upon rotation, may facilitate rotation of the plates 212. Since, the plates 212 are fixedly connected to the corresponding secondary shaft of the secondary shafts 210, the corresponding secondary shaft of the secondary shafts 210, upon rotation of the plates 212, may be adapted to rotate.

The secondary bearings 228 may be mounted on the third panel 114c. The secondary bearings 228 may be disposed around the primary bearing 226. The secondary bearings 228 may be disposed at an end of the secondary shafts 210. Specifically, each secondary bearing of the secondary bearings 228 may be disposed at the end of corresponding secondary shaft of the secondary shafts 210. In other words, the end of each secondary shaft of the secondary shafts 210 may be inserted into the corresponding secondary bearing of the secondary bearings 228. The secondary bearings 228 may therefore facilitate rotation of the secondary shafts 210. In other words, each secondary bearing of the secondary bearings 228 may facilitate rotation of corresponding secondary shaft of the secondary shafts 210. Specifically, a rotating element of the secondary bearings 228 may facilitate rotation of the secondary shafts 210.

In some embodiments of the present disclosure, the secondary bearings 228 may be disposed at either ends of the secondary shafts 210. In other words, a pair of secondary bearings may be disposed at either ends of one secondary shaft of the secondary shafts 210. Similarly, multiple pairs of secondary bearings may be disposed at either ends of corresponding secondary shaft of the secondary shafts 210. In such a scenario, each pair of secondary bearings may facilitate rotation of the corresponding secondary shaft of the secondary shafts 210.

The secondary sprockets 214 may be coupled to the secondary shafts 210. Specifically, each secondary sprocket of the secondary sprockets 214 may be coupled to the corresponding secondary shaft of the secondary shafts 210. Each secondary sprocket of the secondary sprockets 214 may include a through hole that may be disposed the center of each secondary sprocket of the secondary sprockets 214. To couple each of the secondary sprockets 214 with the corresponding secondary shaft, the secondary shaft of the secondary shafts 210 may be inserted into the through hole of the corresponding secondary sprocket of the secondary sprockets 214. Since, the secondary sprockets 214 are fixedly connected to the secondary shafts 210, therefore the secondary sprockets 214, upon rotation of the secondary shafts 210, also rotate. Specifically, the corresponding secondary sprocket of the secondary sprockets 214 may rotate upon rotation of the respective secondary shaft of the secondary shafts 210.

The rods 216 may be disposed around the secondary shafts 210. Each rod of the rods 216 may extend along the longitudinal axis (X-X) of the drive mechanism 106. Each rod of the rods 216 may be arranged in a parallel configuration with the primary shaft 204 and the secondary shafts 210. The rod sprockets 218 may be coupled to the rods 216. Specifically, each rod sprocket of the rod sprockets 218 may be coupled to corresponding rod of the rods 216. Each rod sprocket of the rod sprockets 218 may include a through hole that may be disposed at the center of that rod sprocket. To couple the rod sprocket with the corresponding rod of the rods 216, the corresponding rod may be inserted into the through hole of the corresponding rod sprocket of the rod sprockets 218. The rods 216 may be coupled to the secondary shafts 210. In other words, each rod of the rods 216 may be coupled to the corresponding secondary shaft of the secondary shafts 210. Specifically, each rod of the rods 216 may be coupled to the corresponding secondary shaft of the secondary shafts 210 through the corresponding secondary chain of the secondary chains 220. Each of the secondary chains 220 may be wrapped around corresponding pair of the secondary sprocket of the secondary sprockets 214 and the rod sprocket of the rod sprockets 218. For example, the first secondary chain 220a may be wrapped around the first secondary sprocket 214a and the first rod sprocket 218a. The second secondary chain 220b may be wrapped around the second secondary sprocket 214b and the second rod sprocket 218b. The third secondary chain 220c may be wrapped around the third secondary sprocket 214c and the third rod sprocket 218c. The fourth secondary chain 220d may be wrapped around the fourth secondary sprocket 214d and the fourth rod sprocket 218d.

Each of the secondary chains 220 may facilitate rotation of the rods 216. Specifically, each of the secondary chains 220 may facilitate rotation of the rods 216 upon rotation of the secondary sprockets 214 of the secondary shafts 210. For example, the first secondary chain 220a may facilitate rotation of the first rod 216a upon rotation of the first secondary sprocket 214a of the first secondary shaft 210a. The second secondary chain 220b may facilitate rotation of the second rod 216b upon rotation of the second secondary sprocket 214b of the second secondary shaft 210b. The third secondary chain 220c may facilitate rotation of the third rod 216c upon rotation of the third secondary sprocket 214c of the third secondary shaft 210c. The fourth secondary chain 220d may facilitate rotation of the fourth rod 216d upon rotation of the fourth secondary sprocket 214d of the fourth secondary shaft 210d.

The rod bearings 222 may be disposed around the secondary shafts 210. The rod bearings 222 may be disposed at either ends of the rods 216. The rod bearings 222 may be mounted on the first panel 114a and the third panel 114c. Specifically, the rod bearings 222 may be disposed at upper and lower ends of the rods 216. Each rod bearing of the rod bearings 222 may facilitate rotation of corresponding rod of the rods 216.

The fasteners 229 may be adapted to couple or adjoin one or more components with the second and third panels 114b, 114c. Specifically, the fasteners 229 may facilitate to couple or mount the primary shaft 204 and the secondary shafts 210 with the second and third panels 114b, 114c.

Figure 2C:
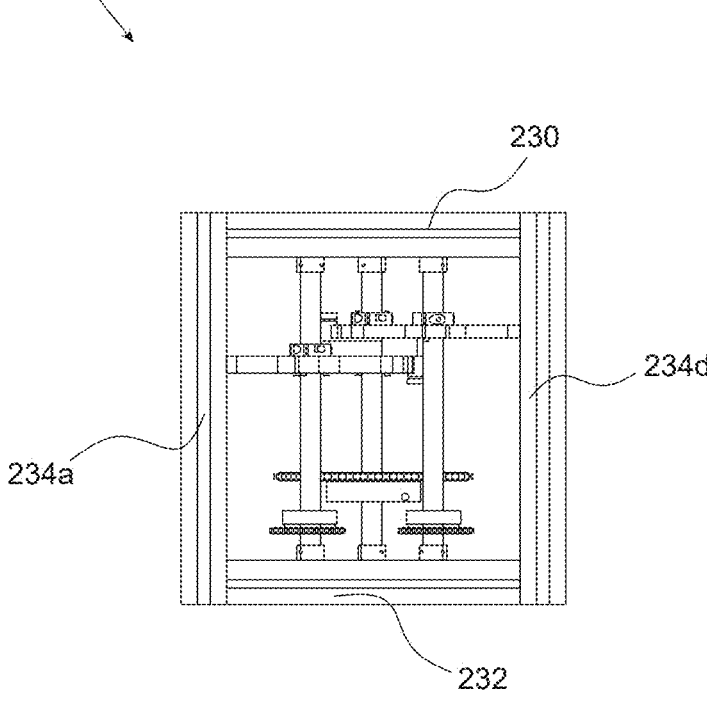
FIG. 2C illustrates a side view of the drive mechanism, in accordance with an embodiment of the present disclosure.

FIG. 2C illustrates a side view of the drive mechanism 106, in accordance with an embodiment of the present disclosure. The drive mechanism 106 may further include a first frame 230, a second frame 232, and a plurality of struts 234a-234d (hereinafter collectively referred to and designated as "the struts 234").

Figure 2D:
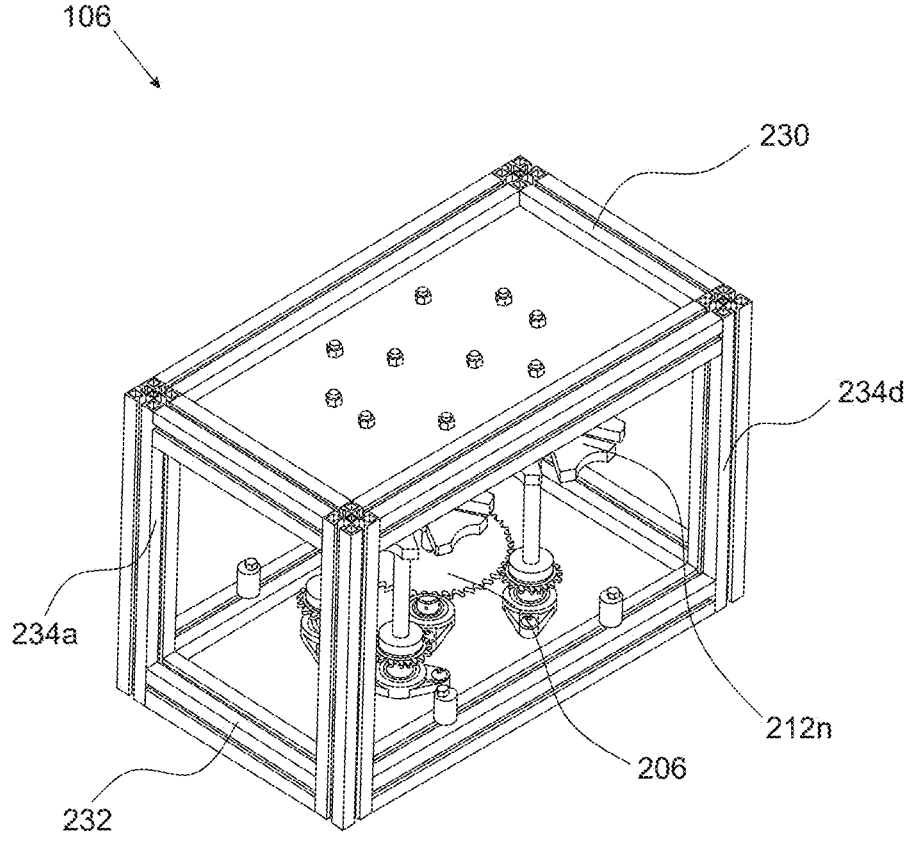
FIG. 2D illustrates a perspective collapsed view of the drive mechanism, in accordance with an embodiment of the present disclosure.

FIG. 2D illustrates a perspective collapsed view of the drive mechanism 106, in accordance with an embodiment of the present disclosure. The collapsed view may refer to an assembled view of the drive mechanism 106 such that components of the drive mechanism 106 are assembled.

The first frame 230 may be disposed at an upper side of the drive mechanism 106 and the second frame 232 may be disposed at a lower side of the drive mechanism 106. The first and second frames 230, 232 may be disposed in a parallel configuration with each other. The first and second frames 230, 232 may be disposed in a parallel configuration with respect to the second and third panels 114b, 114c. Specifically, the first frame 230 may be disposed around the second panel 114b. In other words, the first frame 230 may disposed around the second panel 114b such that the first frame 230 surrounds the second panel 114b. The second frame 232 may be disposed around the third panel 114c. In other words, the second frame 232 may be disposed around the third panel 114c such that the second frame 232 surrounds the third panel 114c.

The struts 234 may be disposed between the first and second frames 230, 232. Specifically, the struts 234 may extend along a perpendicular configuration with respect to the first and second frames 230, 232. The struts 234 may be disposed around the corners of the first and second frames 230, 232. The struts 234 may facilitate to provide a support between the first and second frames 230, 232.

Figure 3A:
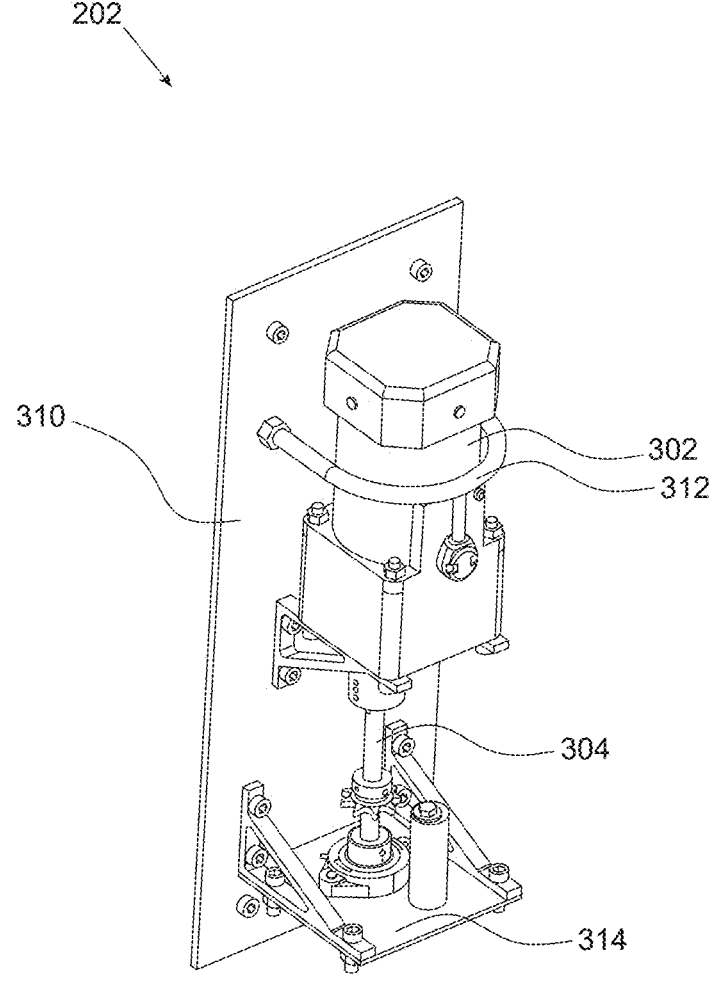
FIG. 3A illustrates a perspective collapsed view of a motor unit of the drive mechanism of FIG. 2A-2B, in accordance with an embodiment of the present disclosure.

FIG. 3A illustrates a perspective collapsed view of the motor unit 202 of the drive mechanism 106 of FIG. 2A-2B, in accordance with an embodiment of the present disclosure. The motor unit 202 may be coupled to the primary shaft 204. The motor unit 202 may be adapted to generate a rotational force such that the primary shaft 204 rotates upon generation of the rotational force.

Figure 3B:
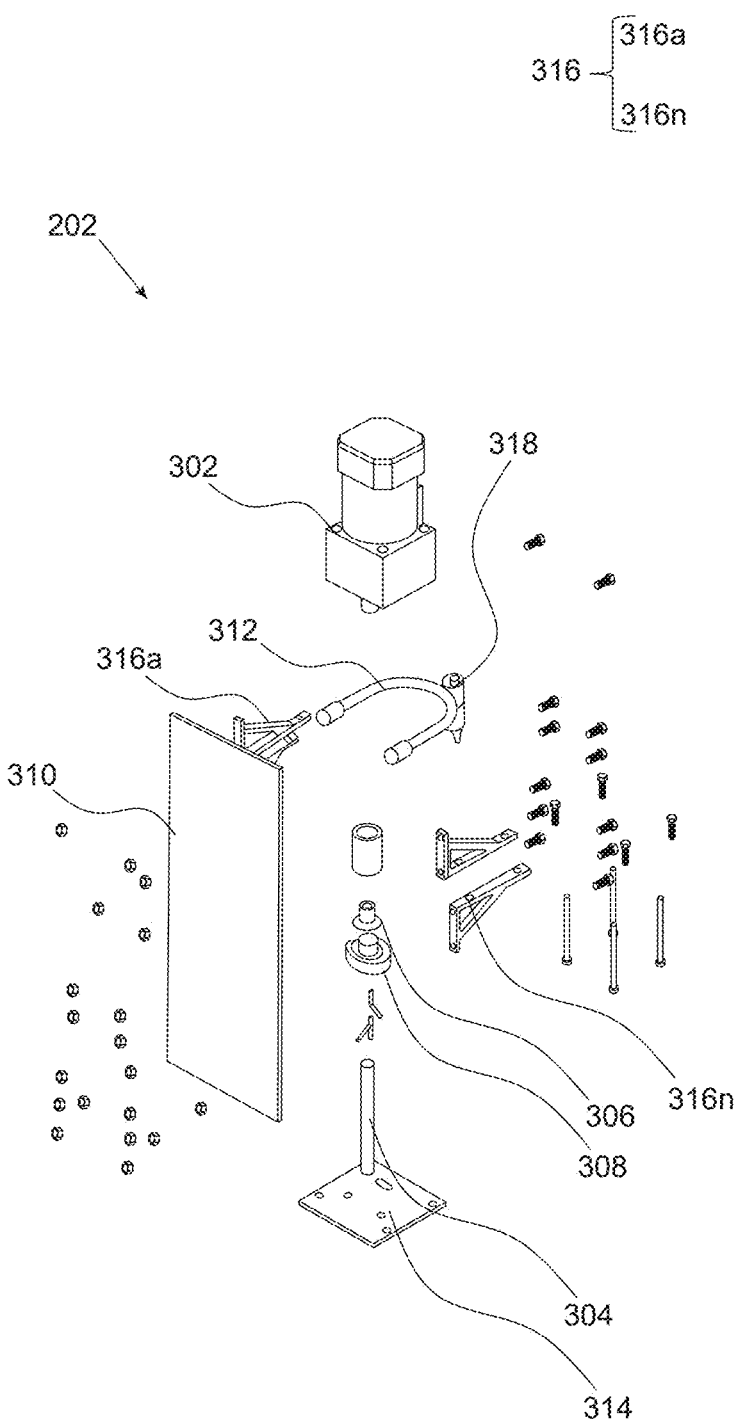
FIG. 3B illustrates a perspective exploded view of the motor unit of the drive mechanism of, in accordance with an embodiment of the present disclosure.

FIG. 3B illustrates a perspective exploded view of the motor unit 202 of the drive mechanism 106 of FIG. 2A-2B, in accordance with an embodiment of the present disclosure. The motor unit 202 may include a motor 302, a motor shaft 304, a drive sprocket 306, a drive bearing 308, a mounting plate 310, a U-shaped bolt 312, a support plate 314, a plurality of braces 316a-316n (hereinafter collectively referred to and designated as "the braces 316"), and a chain tensioner 318.

The motor 302 may be coupled to the mounting plate 310. In other words, the mounting plate 310 may be adapted to firmly/stably hold the motor 302. The mounting plate 310 may be adapted to absorb or mitigate vibrations that may be produced while functioning of the motor 302. The motor 302 may be adapted to generate the rotational force. In some embodiments of the present disclosure, the motor 302 may be adapted to receive an electrical energy from an external source (not shown) such that the motor 302 converts the electrical energy into mechanical energy. This conversion of the electrical energy into the mechanical energy facilitates generation of the rotational force. In some examples of the present disclosure, the external source may be a battery or any other electric device that may produce an electric current.

In some embodiments of the present disclosure, the motor 302 may be one of, a synchronous motor, an asynchronous motor, a brushed motor, a brushless motor, and the like. Embodiments of the present disclosure are intended to include and/or otherwise cover any type of the motor 302, without deviating from the scope of the present disclosure.

The motor shaft 304 may be coupled to the motor 302. The motor shaft 304 may extend along the length of the motor unit 202. The motor shaft 304 may project outwardly from the motor 302. The motor shaft 304 may include first and second ends (not shown) such that the first end may be disposed at an upper side of the motor unit 202 and the second end may be disposed at a lower side of the motor unit 202. The first end of the motor shaft 304 may extend or project outwardly from the motor 302. The lower end of the motor shaft 304 may adjoin with the support plate 314. The motor shaft 304 may be adapted to rotate upon generation of the rotational force by the motor 302. In other words, the motor 302 may be adapted to generate the rotational force to rotate the motor shaft 304.

The drive sprocket 306 may be coupled to the motor shaft 304. The drive sprocket 306 may include a through hole (not shown). The through hole may be disposed at a center of the drive sprocket 306. To couple the drive sprocket 306 with the motor shaft 304, the motor shaft 304 may be passed through the through hole of the drive sprocket 306. The drive sprocket 306 may be adapted to rotate. Specifically, the drive sprocket 306 may be adapted to rotate upon rotation of the motor shaft 304. Since, the drive sprocket 306 is fixedly connected to the motor shaft 304, therefore, upon rotation of the motor shaft 304, the drive sprocket 306 also rotates. The primary chain 208 may be wrapped around the drive sprocket 306 and the primary sprocket 206. Specifically, the primary chain 208 may be drivingly wrapped around the drive sprocket 306 and the primary sprocket 206. The drive sprocket 306, upon rotation, may facilitate to transmit the rotational force to the primary sprocket 206 and then to the primary shaft 204. In other words, the primary chain 208 may facilitate to transmit the rotational force from the motor shaft 304 to the primary shaft 204 to rotate the primary shaft 204. The term "drivingly wrapped" as used herein refers to driving ability of the primary chain 208 upon rotation of the drive sprocket 306. In other words, the term drivingly wrapped indicates or refers to the transmission of the rotational force from the motor shaft 304 to the primary shaft 204 through the primary chain 208.

The drive bearing 308 may be mounted on the support plate 312. The drive bearing 308 may be disposed at an end of the motor shaft 304. In other words, the end of the motor shaft 304 may be inserted into the drive bearing 308. The drive bearing 308 may facilitate rotation of the motor shaft 304. Specifically, a rotating element of the drive bearing 308 may facilitate rotation of the motor shaft 304. The drive bearing 308 may facilitate rotation of the motor shaft 304 upon generation of the rotational force by the motor 302.

The mounting plate 310 may be disposed ahead of the motor unit 202. The mounting plate 310 may be a slab like structure that may extend along a length of the motor unit 202. The mounting plate 310 may be adapted to mount the motor unit 202 to any surface. Specifically, the mounting plate 310 may facilitate to mount the motor unit 202 at the lower portion 112 of the cabinet 102. The mounting plate 310 may further facilitate to protect other components of the motor unit 202. For example, the mounting plate 310 may facilitate to protect the motor 302, the motor shaft 304, the drive sprocket 306, and the drive bearing 308 of the motor unit 202.

In some embodiments of the present disclosure, the mounting plate 310 may be made up of a material including, but not limited to, steel, iron, aluminium, plastic, and the like. Embodiments of the present disclosure are intended to include and/or otherwise cover any type of material for the mounting plate 310, without deviating from the scope of the present disclosure.

The U-shaped bolt 312 may be disposed around the motor 302. The U-shaped bolt 312 may be coupled to the motor 302 and the mounting plate 310. One side of the U-shaped bolt 312 may cover the motor 302 and another side of the U-shaped bolt 312 may be coupled to the mounting plate 310. To hold the motor 302 with the mounting plate 310, a U-shaped portion of the U-shaped bolt 312 may abut the motor 302 and straight ends of the U-shaped bolt 312 may be coupled to the mounting plate 310. Thus, the U-shaped bolt 312 may be adapted to hold the motor 302 along-with the mounting plate 310.

Specifically, the U-shaped bolt 312 may be adapted to firmly/stably hold the motor 302 with the mounting plate 310. The U-shaped bolt 312 may further facilitate to eliminate the vibrations that may be produced by the motor 302 while the motor 302 generates the rotational force.

The support plate 314 may be disposed at the lower side of the motor unit 202. The support plate 314 may be a slab like structure that may be coupled to the mounting plate 310. Specifically, the support plate 314 may be positioned or arranged in a perpendicular configuration with respect to the mounting plate 310. The support plate 314 may be adapted to hold or carry one or more components of the motor unit 202.

The braces 316 may be coupled to the motor 302, the mounting plate 310, and the support plate 314. Specifically, the braces 316 may be coupled to the motor 302 and the support plate 314 by way of a suitable fastening means. In some examples, the suitable fastening means may include, but not limited to, a nut, a bolt, a rivet, and the like. Embodiments of the present disclosure are intended to include and/or otherwise cover any type of known and later developed fastening means, without deviating from the scope of the present disclosure. Each brace of the braces 316 may have an angled structure that may facilitate to support one or more components of the motor unit 202. The braces 316 may be adapted to support the motor 302 and the support plate 314. Specifically, one pair of braces of the braces 316 may be adapted to support the motor 302 and another pair of braces of the braces 316 may be adapted to support the support plate 314. For example, the first and second braces 316a, 316b may be adapted to support the motor 302 and the third and fourth braces 316c, 316d may be adapted to support the support plate 314.

The chain tensioner 318 may be disposed on the support plate 314. Specifically, the chain tensioner 318 may extend outwardly from the support plate 314. The chain tensioner 318 may have a length that may correspond to position of the drive sprocket 306. In other words, the length of the chain tensioner 318 may be such that the chain tensioner 318 extends up to the position of the drive sprocket 306. In other words, the chain tensioner 318 may extend outwardly from the support plate 314 such that an upper end of the chain tensioner 318 and the drive sprocket 306 are at same level. The chain tensioner 318 may be adapted to adjust tension associated with any chain. Preferably, the chain tensioner 318 may be adapted to adjust the tension associated with the primary chain 208. The chain tensioner 318 may therefore advantageously eliminate slack, if any, that may be present in the primary chain 208. The chain tensioner 318 may therefore advantageously facilitate smoot transmission of the rotational force from the motor shaft 304 to the primary shaft 204.

Figure 4:
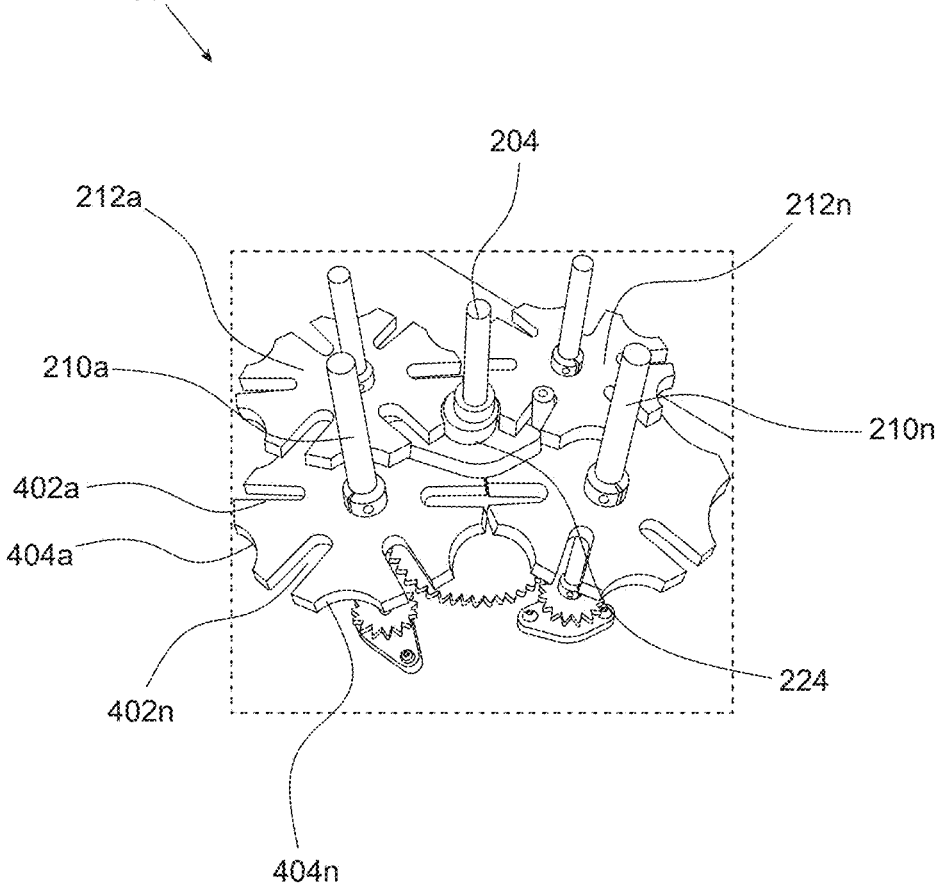
FIG. 4 illustrates a perspective view of an arrangement of a primary shaft, secondary shafts, and plates, in accordance with an embodiment of the present disclosure.

FIG. 4 illustrates a perspective view of an arrangement 400 of the primary shaft 204, the secondary shafts 210 and the plates 212, in accordance with an embodiment of the present disclosure. The arrangement 400 may form part of the drive mechanism 106.

The primary shaft 204 may be positioned at the center of the arrangement 400. The primary shaft 204 may extend along the longitudinal axis (X-X) of the driving mechanism The primary shaft 204 may be adapted to rotate the drive piece 224 that may be coupled to the primary shaft 204. In some embodiments of the present disclosure, the arrangement 400 may include more than one primary shaft. In such a scenario, the plurality of primary shafts may facilitate rotation of corresponding drive pieces. The corresponding drive pieces may further facilitate rotation of the corresponding plates.

The secondary shafts 210 may be disposed around the primary shaft 204. In other words, the secondary shafts 210 may surround the primary shaft 204. The secondary shafts 210 may be arranged in a parallel configuration with respect to the primary shaft 204. Each secondary shaft of the secondary shafts 210 may extend along the longitudinal axis (X-X) of the drive mechanism 106. The secondary shafts 210 may be positioned at a distance from the primary shaft 204. The distance between each of the secondary shafts 210 and the primary shaft 204 may depend on dimensions of the drive piece 224 and each plate of the plates 212. Specifically, the distance between each of the secondary shafts 210 and the primary shaft 204 may depend on the length of the drive piece 224 and the diameter of each plate of the plates 212.

The plates 212 may be disposed around the primary shaft 204 and the drive piece 224. Some plates of the plates 212 may be disposed below the drive piece 224 and some plates of the plates 212 may be disposed above the drive piece 224. For example, the first and second plates 212a, 212b may be disposed below the drive piece 224 and the third and fourth plates 212c, 212d may be disposed above the drive piece 224. Each plate of the plates 212 may include a plurality of channels 402a-402n (hereinafter collectively referred to and designated as "the channels 402"). In other words, the channels 402 may be featured on the surface of each plate of the plates 212. In other words, the channels 402 may be formed on the surface of each plate of plates 212. Each channel of the channels 402 may be a U-shaped channel. Specifically, each channel of the channels 402 may extend from an outer surface of the corresponding plate to a point that may be near to an inner surface of that plate of the plates 212. In other words, each channel of the channels 402 may be open at the outer side of the plate and closed at the inner side of that plate. Each plate of the plates 212 may further include a plurality of curved surfaces 404a-404n (hereinafter collectively referred to and designated as "the curved surfaces 404"). Each curved surface of the curved surfaces 404 may be positioned between the adjacent channels of the channels 402. The curved surfaces 404 may be positioned or formed at a circumference of each plate of the plates 212.

The channels 402 may facilitate the plates 212 to couple with the drive piece 224. Specifically, the channels 402 of each plate of the plates 212 may facilitate to couple that plate with the drive piece 224 such that the drive piece 224, upon rotation, rotates that plate of the plates 212. Specifically, each channel of the channels 402 may engage with a component of the drive piece 224. In other words, the component of the drive piece 224 may engage with each channel of the channels 402. Specifically, the component of the drive piece 224, upon rotation of the drive piece 224, may intermittently engage with each channel of the channels 402 of each plate of the plates 212. Each plate of the plates 212 may exhibit rotation upon an intermittent engagement of the component of the drive piece 224 with a channel of the channels 402 of respective plate of the plates 212. Specifically, each plate of the plates 212 may exhibit an intermittent rotation upon the intermittent engagement of the component of the drive piece 224 with the channel of the channels 402 of respective plate of the plates 212.

In some embodiments of the present disclosure, each plate of the plates 212 may have a thickness that may be in a range of 0.125 inch to 3 inches. Embodiments of the present disclosure are intended to include and/or otherwise cover any dimension range/value for the plates 212 depending on dimension of the display unit 100, without deviating from the scope of the present disclosure.

In some embodiments of the present disclosure, each channel of the channels 402 may have a width that may be in a range of 0.0625 inch to 3 inches. Embodiments of the present disclosure are intended to include and/or otherwise cover any dimension range/value for the channels 402 depending on dimension of the display unit 100, without deviating from the scope of the present disclosure.

In some embodiments of the present disclosure, each channel of the channels 402 may have a length that may be in a range of 1 inch to 12 inches. Embodiments of the present disclosure are intended to include and/or otherwise cover any dimension range/value for the channels 402 depending on dimension of the display unit 100, without deviating from the scope of the present disclosure.

In some embodiments of the present disclosure, each curved surface of the curved surface 404 may have a radius of curvature that may be in a range of 0.125 inch to 5 inches. Embodiments of the present disclosure are intended to include and/or otherwise cover any dimension range/value for the curved surface 404 depending on dimension of the display unit 100, without deviating from the scope of the present disclosure.

Figure 5A:
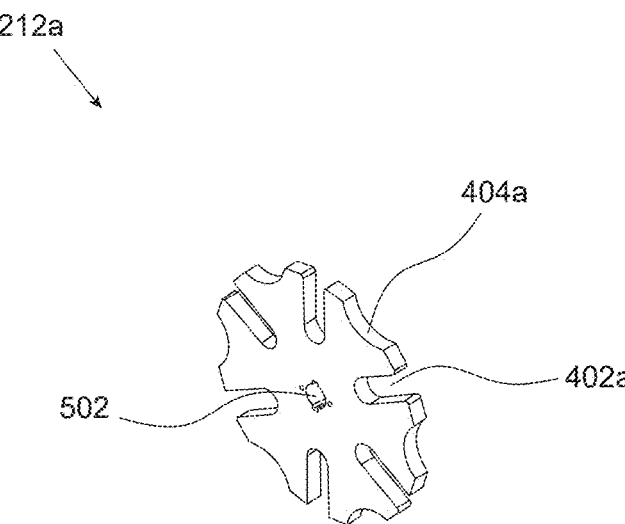
FIG. 5A a perspective view of a first plate, in accordance with an embodiment of the present disclosure.

FIG. 5A illustrates a perspective view of the first plate 212a, in accordance with an embodiment of the present disclosure. The first plate 212a may further include a through hole 502. The through hole 502 may be disposed at the center of the first plate 212a. The channel 402a may be disposed on a surface of the first plate 212a. Specifically, the channel 402a may be formed by cutting the surface of the first plate 212a along a radial direction of the first plate 212a. In other words, the channel 402a may be formed by providing a cut on the first plate 212a along the radial direction of the first plate 212a. The curved surface 404a may be disposed at a circumference of the first plate 212a. Specifically, the curved surface 404a may be formed by providing an inner curve at the circumference of the first plate 212a. In other words, the circumference of the first plate 212a may be machined such that a predefined material of the first plate 212a may be removed and thereby leaving behind a curved surface at the circumference of the first plate 212a.

The through hole 502 may facilitate the first plate 212a to couple to the first secondary shaft 210a. In other words, the first secondary shaft 210a may be inserted into the through hole 502 such that upon insertion of the first secondary shaft 210a in the through hole 502, the first plate 212a is coupled to the first secondary shaft 210a.

Figure 5B:
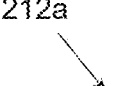
FIG. 5B illustrates a front view of the first plate of the FIG. 5A, in accordance with an embodiment of the present disclosure.
Figure 5B:
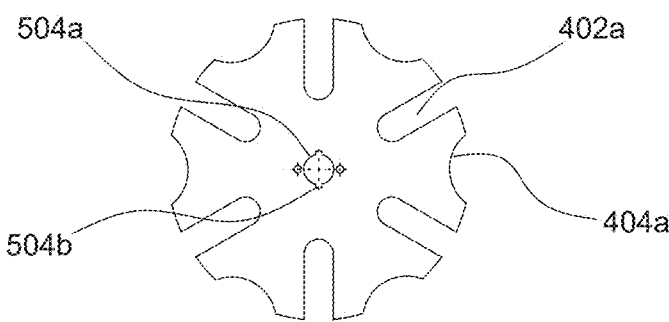

FIG. 5B illustrates a front view of the first plate 212a of the FIG. 5A, in accordance with an embodiment of the present disclosure. The first plate 212a may further include a pair of keyways 504*a*, 504*b* (hereinafter collectively referred to and designated as "the keyways 504"). The keyways 504 may be disposed at either side of the through hole 502. Specifically, one keyway of the keyways 504 may be disposed at one side of the through hole 502 and another keyway of the keyways 504 may be disposed at another side of the through hole 502. The keyways 504 may be adapted to receive a plurality of keys (not shown) while the first plate 212*a* is coupled to the first secondary shaft 210*a*. In other words, one key may be inserted in the first keyway 504*a* and another key may be inserted in the second keyway 504*b*. The keys may facilitate a mechanical locking of the first plate 212*a* with the first secondary shaft 210*a*.

Specifically, the keys may facilitate the mechanical locking of the first plate 212*a* with the first secondary shaft 210*a* when the first secondary shaft 210*a* is inserted in the through hole 502. The keys may therefore prevent undesired displacement of the first plate 212*a* on the first secondary shaft 210*a*. Specifically, the keys may advantageously prevent slippage of the first plate 212*a* when the first plate 212*a* is coupled to the first secondary shaft 210*a*.

Although, FIGS. 5A and 5B illustrates about only one plate i.e., the first plate 212*a*, however, the scope of the present disclosure is not limited to it. It will be apparent to a person skilled in the art that other plates i.e., the second through fourth plates 212*b*-212*d* exhibits same or substantially similar structure to that of the first plate 212*a* as explained hereinabove. In other words, the second through fourth plates 212*b*-212*d* are structurally, functionally, and configurationally same or substantially similar to the first plate 212*a*, without deviating from the scope of the present disclosure.

Figure 5C:
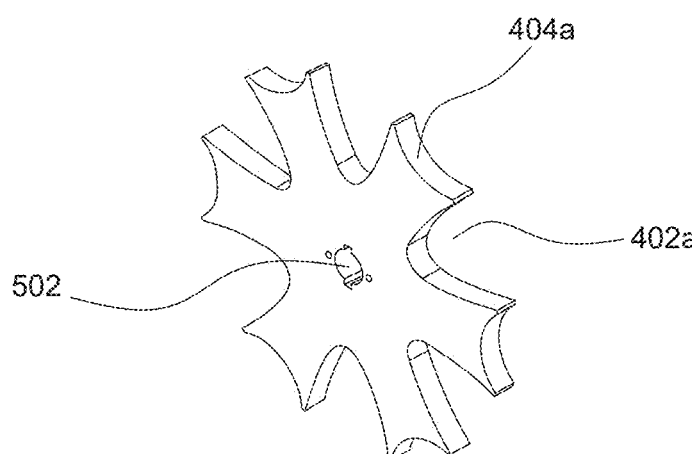
FIG. 5C illustrates a perspective view of another first plate, in accordance with an embodiment of the present disclosure.
Figure 5D:
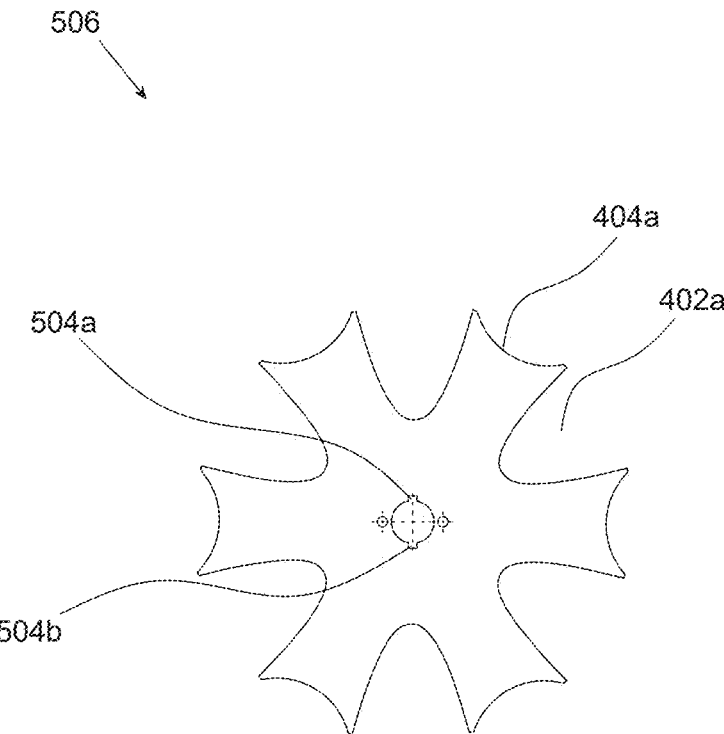
FIG. 5D illustrates a front view of the first plate of the FIG. 5C, in accordance with an embodiment of the present disclosure.

FIG. 5C illustrates a perspective view of another first plate 506, in accordance with an embodiment of the present disclosure. FIG. 5D illustrates a front view of the first plate 506 of the FIG. 5C, in accordance with an embodiment of the present disclosure. The first plate 506 may be functionally and configurationally same or substantially similar to the first plate 212*a* of FIG. 5A-5B, with like elements that are referenced with like numerals, however, the first plate 506 may exhibit a different shape from the first plate 212*a*. Specifically, dimensions of the channel 402*a* and the curved surface 404*a* of the first plate 506 may be different from dimensions of the channel 402*a* and the curved surface 404*a* of the first plate 212*a*. Thus, the first plate 506 may be structurally different from the first plate 212*a*, however, the first plate 506 may be functionally and configurationally same or substantially similar to the first plate 212*a*, without deviating from the scope of the present disclosure.

Figure 6A:
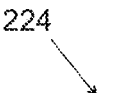
FIG. 6A illustrates a perspective collapsed view a drive piece of the drive mechanism of FIG. 2A-2D, in accordance with an embodiment of the present disclosure.
Figure 6A:
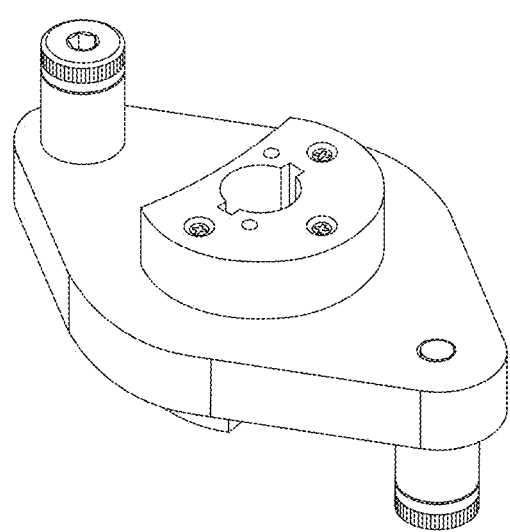

FIG. 6A illustrates a perspective collapsed view of the drive piece 224 of the drive mechanism 106 of FIG. 2A-2D, in accordance with an embodiment of the present disclosure. The drive piece 224 may be adapted to intermittently engage with a channel of the channels 402 of each plate of the plates 212. The drive piece 224 may therefore ensure intermittent rotation of each plate of the plates 212. In other words, the drive piece 224 may ensure rotation of each plate of the plates 212 after a predefined interval of time.

Figure 6B:
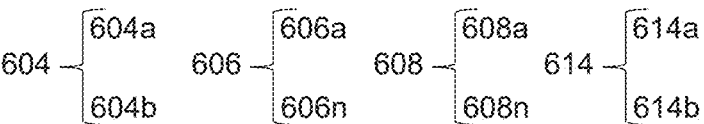
FIG. 6B illustrates a perspective exploded view of the drive piece of the FIG. 6A, in accordance with an embodiment of the present disclosure.
Figure 6B:
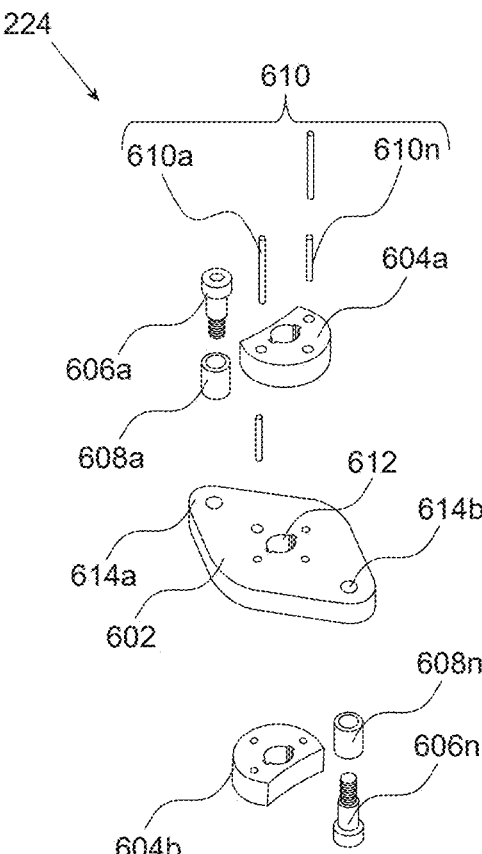

FIG. 6B illustrates a perspective exploded view of the drive piece 224 of the FIG. 6A, in accordance with an embodiment of the present disclosure. The drive piece 224 may include a drive plate 602, a pair of locking plates 604*a*, 604*b* (hereinafter collectively referred to and designated as "the locking plates 604"), a plurality of pins 606*a*-606*n* (hereinafter collectively referred to and designated as "the pins 606"), a plurality of bushings 608*a*-608*n* (hereinafter collectively referred to and designated as "the bushings

608"), and a plurality of fastening means 610*a*-610*n* (hereinafter collectively referred to and designated as "the fastening means 610").

The drive plate 602 may form a supporting element of the drive piece 224. The drive plate 602 may include a bore 612 that may be disposed at the center of the drive plate 602. The bore 612 may facilitate the drive plate 602 to couple the drive plate 602 with the primary shaft 204. Specifically, the primary shaft 204 may be passed through the bore 612 such that the drive plate 602 is fixedly connected to the primary shaft 204. The drive plate 602 may have a cross-sectional shape that may resemble to a shape of a rhombus. In other words, the cross-sectional shape of the drive plate 602 may be a rhombic shape. The drive plate 602 may further include first and second elongated ends 614*a*, 614*b* (hereinafter collectively referred to and designated as "the elongated ends 614"). The first and second elongated ends 614 may be disposed opposite to each other. For example, the first elongated end 614*a* may be disposed at a right side of the drive plate 602 and the second elongated end 614*b* may be disposed at a left side of the drive plate 602.

The locking plates 604 may be coupled to the drive plate 602. Specifically, the locking plates 604 may be coupled to the drive plate 602 through the fastening means 610. In some embodiments of the present disclosure, the fastening means 610 may include, but not limited to, a bolt, a nut, a rivet, and the like. Embodiments of the present disclosure are intended to include and/or otherwise cover any type of the fastening means 610, without deviating from the scope of the present disclosure. Each locking plate of the locking plates 604 may be disposes on the surface of the drive plate 602. For example, the first locking plate 604*a* may be coupled to an upper side of the drive plate 602. In other words, the first locking plate 604*a* may be coupled to the upper surface of the drive plate 602. The second locking plate 604*b* may be coupled to a lower side of the drive plate 602. In other words, the second locking plate 604*b* may be coupled to the lower surface of the drive plate 602. The locking plates 604 may be arranged such that the drive plate 602 is sandwiched between the first locking plate 604*a* and the second locking plate 604*b*. The locking plates 604 may include through holes that may be disposed at the center of the locking plates. For example, each of the first and second locking plates 604*a*, 604*b* may include a through hole that may be disposed at the center of the first and second locking plates 604*a*, 604*b*. The through holes of the first and second locking plates 604*a*, 604*b* aligns with the bore 612 of the drive plates 602 such that the primary shaft 204 is passed through the bore 612 and the through holes of the first and second locking plates 604*a*, 604*b*. The locking plates 604 may be fitted in the curved surfaces 404 of the plates 212. Specifically, each of the locking plates 604 may intermittently engage or fit within corresponding curved surface of the curved surfaces 404 during intermittent rotation of the plates 212.

The pins 606 may be disposed on a surface of the drive piece 224. Specifically, the pins 606 may be coupled to the drive plate 602. The pins 606 may extend outwardly from the drive plate 602. In other words, each pin of the pins 606 may extend in a direction of the longitudinal axis (X-X). The pins 606 may be coupled to the upper side and the lower side of the drive plate 602. For example, the first pin 606*a* may be coupled to the upper side of the drive plate 602 and the second pin 606*b* may be coupled to the lower side of the drive plate 602. In other words, the first pin 606*a* may extend upwardly from the drive plate 602 and the second pin 606*b* may extend downwardly from the drive plate 602. Specifically, the pins 606 may be coupled to the elongated ends 614 of the drive plate 602. The first pin 606a may be coupled to the first elongated end 614a of the drive plate 602 and the second pin 606b may be coupled to the second elongated end 614b of the drive plate 602. The bushings 608 may be disposed or mounted on the drive plate 602. Specifically, the first bushing 608a may be disposed or mounted on the first elongated end 614a and the second bushing 608b may be disposed or mounted on the second elongated end 614b. The first bushing 608a may be disposed or mounted on the first elongated end 614a such that the first pin 606a extends out from the first bushing 608a. The second bushing 608b may be disposed or mounted on the second elongated end 614b such that the second pin extends out from the second bushing 608b. By virtue of the position of the first and second pins 606a, 606b on the drive plate 602, the first and second pins 606a, 606b revolves upon rotation of the drive piece 224. Specifically, by virtue of position of the first and second pins 606a, 606b on the first and second elongated ends 614a, 614b, respectively, the first and second pins 606a, 606b revolves upon rotation of the drive plate 602. Each pin of the pins 606, upon revolution, may be adapted to intermittently engage with each channel of the channels 402 of each plate of the plates 212. Specifically, each pin of the first and second pins 606a, 606b, upon revolution, may be adapted to intermittently engage with each channel of the channels 402 of each plate of the plates 212. Each plate of the plates 212 may be adapted to exhibit rotation upon the intermittent engagement of a pin of the pins 606 with a channel of the channels 402 of respective plate of the plates 212. Specifically, each plate of the plates 212 may be adapted to exhibit intermittent rotation upon the intermittent engagement of the first and second pins 606a, 606b with a channel of the channels 402 of respective plate of the plates 212. In some preferred embodiments of the present disclosure, the pins 606 may be disposed on a plurality of locations of the surface of the drive piece 224. Specifically, the pins 606 may be coupled to a plurality of locations of the surface of the drive piece 224 to facilitate different combinations of revolutions of the pins 606 around the primary shaft 204. The term "plurality of locations" as used herein refers to different locations on the surface of the drive piece 224. The different locations may include locations on the surface of the drive piece 224 along the length of the drive piece 224.

Figure 6C:
FIG. 6C illustrates a perspective view of another drive piece, in accordance with an embodiment of the present disclosure.
Figure 6C:
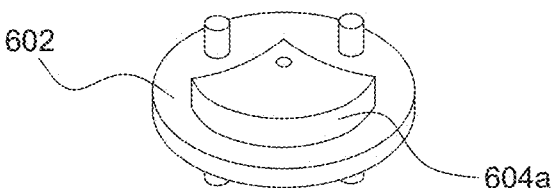

FIG. 6C illustrates a perspective view of another drive piece 616, in accordance with an embodiment of the present disclosure. The drive piece 616 may be functionally and configurationally same or substantially similar to the drive piece 224 of FIGS. 6A and 6B, with like elements that are referenced with like numerals, however, the drive piece 616 may exhibit a different shape from that of the drive piece 224. Specifically, shape of drive plate and locking plates of the drive piece 616 is different from shape of the drive plate 602 and the locking plates 604 of the drive piece 224. Thus, the drive piece 616 may be structurally different from the drive piece 224, however, the drive piece 616 may be functionally and configurationally same or substantially similar to the drive piece 224, without deviating from the scope of the present disclosure.

Figure 6D:
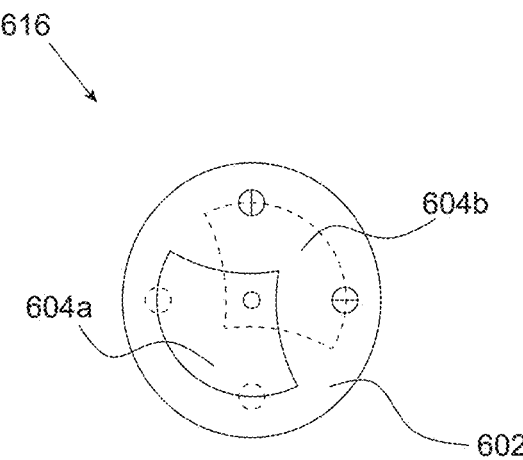
FIG. 6D illustrates a top view of the drive piece of the FIG. 6C, in accordance with an embodiment of the present disclosure.

FIG. 6D illustrates a top view of the drive piece 616 of the FIG. 6C, in accordance with an embodiment of the present disclosure. The drive plate 602 of the drive piece 616 may exhibit a circular shape. The locking plates 604 of the drive piece 616 may exhibit a shape similar to a triangle such that a side may have an arcuate profile. Specifically, a cross-sectional shape of the locking plates 604 may be a sector of a circle with an arcuate profile. The locking plates 604 may be disposed at an off-centre side of the drive plate 602. Specifically, the first locking plate 604a may be disposed at an upper side of the drive plate 602 and the second locking plate 604b may be disposed at a lower side of the drive plate 602. The first locking plate 604a may be disposed at one off-centric side of the drive plate 602 and the second locking plate 604b may be disposed at another off-centric side of the drive plate 602. Specifically, the first locking plate 604a may be disposed opposite to the second locking plate 604b on the drive plate 602.

Figure 6E:
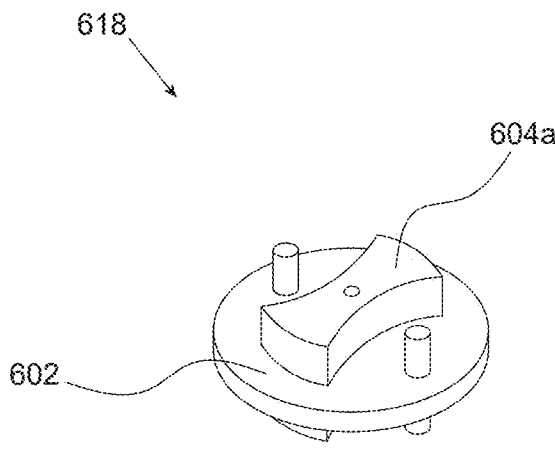
FIG. 6E illustrates a perspective view of another drive piece, in accordance with an embodiment of the present disclosure.

FIG. 6E illustrates a perspective view of another drive piece 618, in accordance with an embodiment of the present disclosure. The drive piece 618 may be functionally and configurationally same or substantially similar to the drive piece 224 of FIGS. 6A and 6B, with like elements that are referenced with like numerals, however, the drive piece 618 may exhibit a different shape from that of the drive piece 224. Specifically, shape of drive plate and locking plates of the drive piece 618 is different from shape of the drive plate 602 and the locking plates 604 of the drive piece 224. Thus, the drive piece 618 may be structurally different from the drive piece 224, however, the drive piece 618 may be functionally and configurationally same or substantially similar to the drive piece 224, without deviating from the scope of the present disclosure.

Figure 6F:
FIG. 6F illustrates a side view of the drive piece of the FIG. 6E, in accordance with an embodiment of the present disclosure.
Figure 6F:
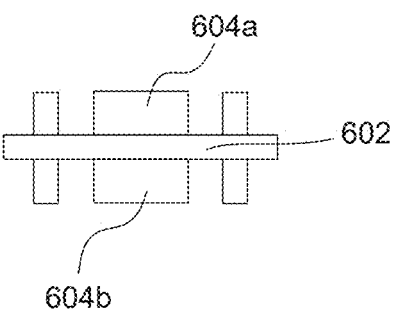

FIG. 6F illustrates a side view of the drive piece 618 of the FIG. 6E, in accordance with an embodiment of the present disclosure. The drive plate 602 of the drive piece 618 may exhibit a circular shape. The locking plates 604 of the drive piece 618 may exhibit a shape similar to a rectangle such that sides of the rectangle have a curved profile. Specifically, a cross-sectional shape of the locking plates 604 of the drive piece 618 may be a rectangle with curved sides. The locking plates 604 may be disposed at a central region of the drive plate 602. The first and second locking plates 604a, 604b may be disposed at the central region of the drive plate 602 such that the position of the first and second locking plates 604a, 604b overlaps with each other. Specifically, the position of the first and second locking plates 604a, 604b may be same i.e., the central region of the drive plate 602. However, the first locking plate 604a may be disposed at an upper side of the drive plate 602 and the second locking plate 604b may be disposed at a lower side of the drive plate 602.

Figure 6G:
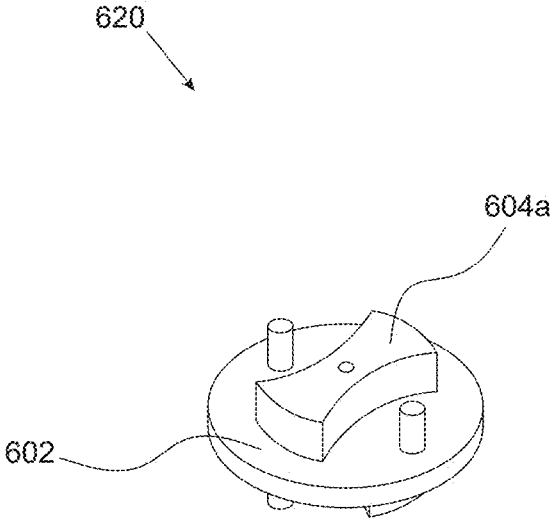
FIG. 6G illustrates a perspective view of another drive piece, in accordance with an embodiment of the present disclosure.

FIG. 6G illustrates a perspective view of another drive piece 620, in accordance with an embodiment of the present disclosure. The drive piece 620 may be functionally and configurationally same or substantially similar to the drive piece 224 of FIGS. 6A and 6B, with like elements that are referenced with like numerals, however, the drive piece 620 may exhibit a different shape from that of the drive piece 224. Specifically, shape of drive plate and locking plates of the drive piece 620 is different from shape of the drive plate 602 and the locking plates 604 of the drive piece 224. Thus, the drive piece 620 may be structurally different from the drive piece 224, however, the drive piece 620 may be functionally and configurationally same or substantially similar to the drive piece 224, without deviating from the scope of the present disclosure.

Figure 6H:
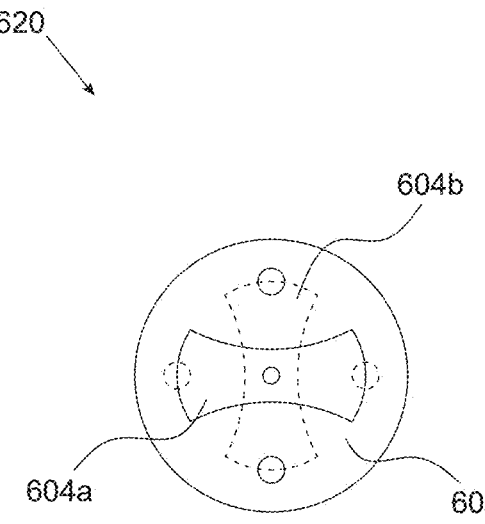
FIG. 6H illustrates a top view of the drive piece of the FIG. 6G, in accordance with an embodiment of the present disclosure.

FIG. 6H illustrates a top view of the drive piece 620 of the FIG. 6G, in accordance with an embodiment of the present disclosure. The locking plates 604 of the drive piece 618 may exhibit a shape similar to a rectangle such that sides of the rectangle have a curved profile. Specifically, a cross-sectional shape of the locking plates 604 of the drive piece 618 may be a rectangle with curved sides. The locking plates 604 may be disposed at a central region of the drive plate 602. The first and second locking plates 604a, 604b may be disposed at the central region of the drive plate 602 such that the position of the first and second locking plates 604a, 604b makes a cross with each other. Specifically, the position of the first and second locking plates 604a, 604b may be same i.e., the central region of the drive plate 602. However, the first locking plate 604a may be disposed at an upper side of the drive plate 602 with one configuration and the second locking plate 604b may be disposed at a lower side of the drive plate 602 with another configuration.

Figure 7A:
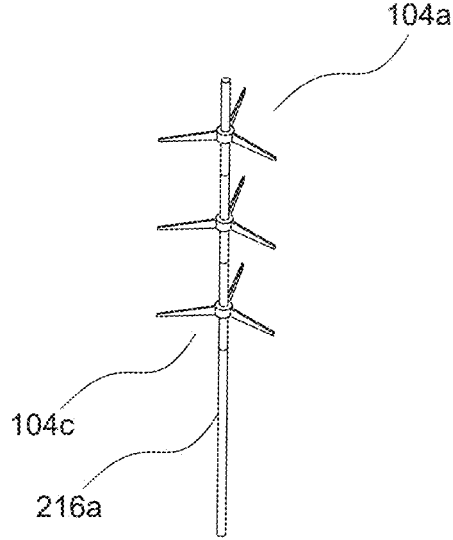
FIG. 7A illustrates a perspective view of a first rod carrying bases, in accordance with an embodiment of the present disclosure.

FIG. 7A illustrates a perspective view of the first rod 216a carrying the bases 104, in accordance with an embodiment of the present disclosure. The first rod 216a may extend along the longitudinal axis (X-X) of the drive mechanism 106. In some examples, the first through third bases 104a-104c of the bases 104 may be coupled to the first rod 216a. In some other examples any number of bases may be coupled to the first rod 216a. The bases 104 may include a through hole that may be positioned at the center of the bases 104. In other words, each base of the bases 104 may include the through hole that may be positioned at the center of that base of the bases 104. For example, each of the first through third bases 104a-104c may include the through hole that may be positioned at the center of the first through third bases 104a-104c such that the first rod 216a is inserted through the through holes of the first through third bases 104a-104c. In other words, to couple the bases 104 with the first rod 216a, the first rod 216a may be inserted into the through holes of each base of the bases 104. The intermittent rotation of the plates 212 facilitates intermittent rotation of the rods 216. Specifically, the intermittent rotation of one plate of the plates 212 may facilitate intermittent rotation of the first rod 216a. The intermittent rotation of the first rod 216a further facilitates intermittent rotation of the bases 104. Thus, the intermittent rotation of the bases 104 facilitates easy view of the articles that may be placed on the bases 104.

Although FIG. 7A shows the first rod 216a, however, it will be apparent to a person skilled in the art that the scope of the present disclosure is not limited to it. The other rods, for example, second through fourth rods 216b-216d, may be structurally, functionally, and configurationally same or substantially similar to the first rod 216a, as explained hereinabove, without deviating from the scope of the present disclosure. For sake of brevity, the second through fourth rods 216b-216d are not explained in detail in the present disclosure.

Figure 7B:
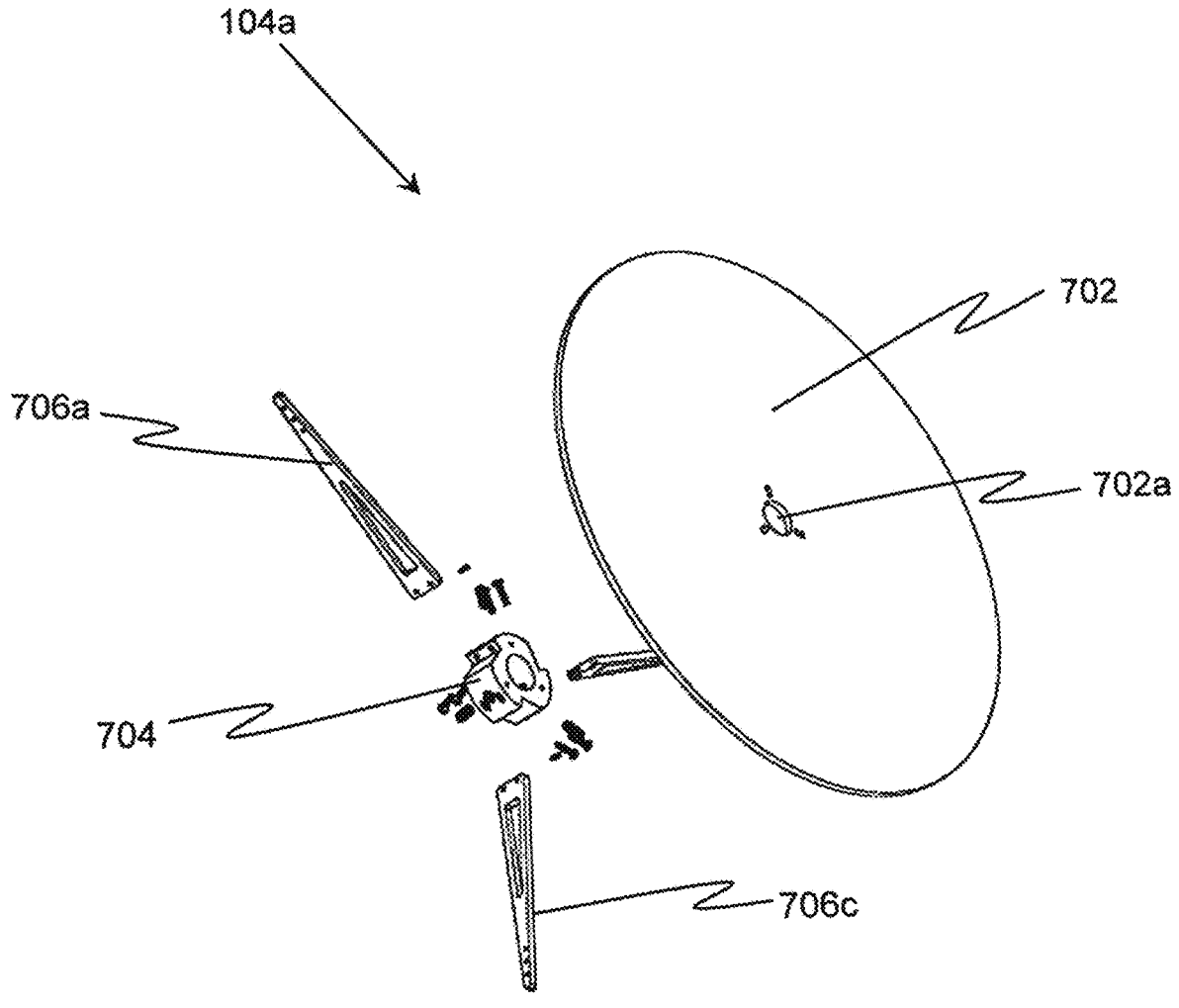
FIG. 7B illustrates a perspective exploded view of a first base, in accordance with an embodiment of the present disclosure.

FIG. 7B illustrates a perspective exploded view of the first base 104a, in accordance with an embodiment of the present disclosure. The first base 104a may include a tray 702, a collar 704, and a plurality of strips 706a-706c (hereinafter collectively referred to and designated as "the strips 706").

The tray 702 may include a through hole 702a that may be positioned at a center of the tray 702. The through hole 702a may facilitate the first base 104a to couple to the first rod 216a. Specifically, the first rod 216a may be inserted into the through hole 702a to facilitate coupling of the first base 104a with the first rod 216a. The collar 704 may be disposed beneath the tray 702. The strips 706 may be coupled to the collar 704. The strips 706 may extend along a radial direction of the tray 702. Specifically, the strips 706 may extend along the radial direction of the tray 702 from the collar 704 such that the strips 706 may be spaced apart from each other. The strips 706 may facilitate to provide support to the tray 702.

Although FIG. 7B shows the first base 104a, however, it will be apparent to a person skilled in the art that the scope of the present disclosure is not limited to it. The other bases, for example, second and third bases 104b, 104c may be structurally, functionally, and configurationally same or substantially similar to the first base 104a, as explained hereinabove, without deviating from the scope of the present disclosure. For sake of brevity, the second and third bases 104b, 104c are not explained in detail in the present disclosure.

Figure 7C:
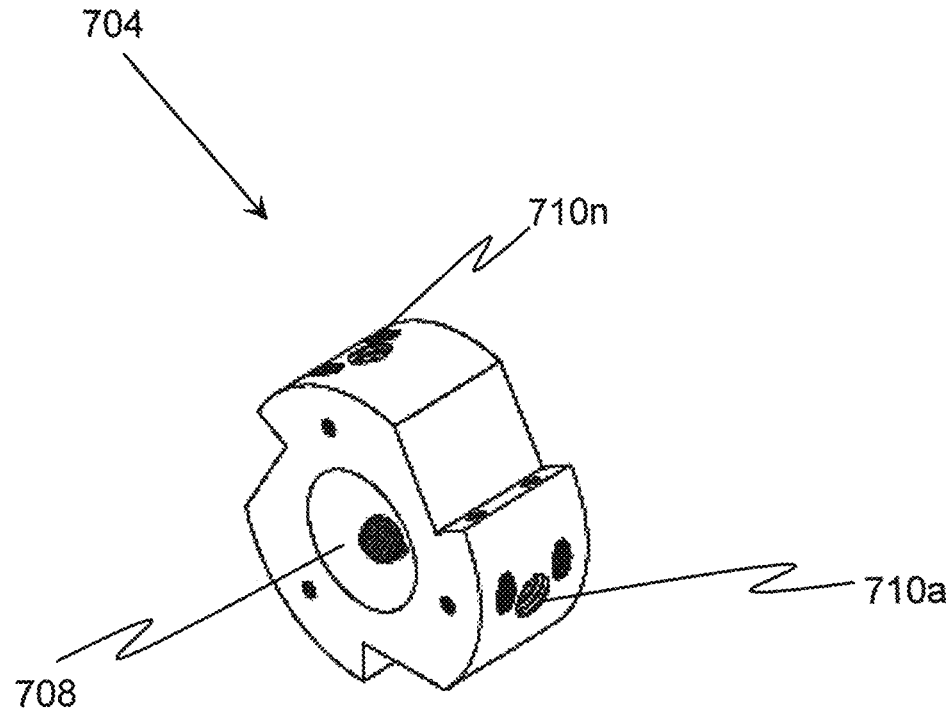
FIG. 7C illustrates a perspective view of a collar of the first base of the FIG. 7B, in accordance with an embodiment of the present disclosure.

FIG. 7C illustrates a perspective view of the collar 704 of the first base 104a of the FIG. 7B, in accordance with an embodiment of the present disclosure. The collar 704 may include an opening 708 and a plurality of apertures 710a-710n (hereinafter collectively referred to and designated as "the apertures 710"). The opening 708 may be disposed at a center of the collar 704. The opening 708 may facilitate the collar 704 to couple to the first rod 216a. Specifically, the first rod 216a may be inserted into the opening 708 to facilitate coupling of the collar 704 with the first rod 216a. The apertures 710 may be disposed at a circumference of the collar 704. The apertures 710 may be adapted to facilitate the strips 706 to couple to the collar 704. Specifically, the apertures 710 may facilitate the strips 706 to couple to the collar 704 such that the strips 706 extend along the radial direction of the tray 702 from the collar 704.

Embodiments of the present disclosure are intended to include and/or otherwise cover another dimensional range for various elements of the display unit 100 without deviating from the scope of the present disclosure.

Thus, the display unit 100 may advantageously facilitate to intermittently show the articles to the viewer. Specifically, the drive mechanism 106 may advantageously facilitate intermittent rotation of the articles such that the viewers see intricate details of the articles. The drive piece 224 facilitates intermittent rotation of the plates 212 such that the plates 212 advantageously facilitate intermittent rotation of the 216. The intermittent rotation of the rods 216 may facilitate intermittent rotation of the bases 104 that may advantageously improve viewing experience for the viewer, while the viewer views the articles. The intermittent rotation of the bases 104 may advantageously facilitate gradual rotation of the bases 104 that may advantageously allow the viewer to spare sufficient time to capture details of the articles placed on the bases 104.

The foregoing discussion of the present disclosure has been presented for purposes of illustration and description. It is not intended to limit the present disclosure to the form or forms disclosed herein. In the foregoing Detailed Description, for example, various features of the present disclosure are grouped together in one or more aspects, configurations, or aspects for the purpose of streamlining the disclosure. The features of the aspects, configurations, or aspects may be combined in alternate aspects, configurations, or aspects other than those discussed above. This method of disclosure is not to be interpreted as reflecting an intention the present disclosure requires more features than are expressly recited in each claim. Rather, as the following claims reflect, inventive aspects lie in less than all features of a single foregoing disclosed aspect, configuration, or aspect. Thus, the following claims are hereby incorporated into this Detailed Description, with each claim standing on its own as a separate aspect of the present disclosure.

Moreover, though the description of the present disclosure has included description of one or more aspects, configurations, or aspects and certain variations and modifications, other variations, combinations, and modifications are within the scope of the present disclosure, e.g., as may be within the skill and knowledge of those in the art, after understanding the present disclosure. It is intended to obtain rights which include alternative aspects, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A drive mechanism comprising:

a motor unit having a motor shaft such that the motor unit generates a rotational force to rotate the motor shaft;

a primary shaft that is coupled to the motor unit, and extends along a longitudinal axis of the drive mechanism such that the primary shaft rotates upon rotation of the motor shaft;

a drive piece that is coupled to the primary shaft such that the drive piece rotates upon rotation of the primary shaft, the drive piece comprising:

a plurality of pins disposed on a surface of the drive piece such that each pin of the plurality of pins extends in a direction of the longitudinal axis, wherein the plurality of pins revolves around the primary shaft upon rotation of the drive piece, wherein the plurality of pins are disposed on a plurality of locations of the surface of the drive piece to facilitate different combinations of revolutions of the plurality of pins around the primary shaft;

a plurality of plates disposed around the primary shaft, each plate of the plurality of plates comprising:

a plurality of channels formed on a surface of each plate of the plurality of plates such that each pin of the plurality of pins, upon revolution, intermittently engages with each channel of the plurality of channels of each plate of the plurality of plates, wherein each plate of the plurality of plates exhibits rotation upon an intermittent engagement of a pin of the plurality of pins with a channel of the plurality of channels of respective plate of the plurality of plates.

2. The drive mechanism of claim 1, further comprising a plurality of secondary shafts that are disposed around the primary shaft, and extends along the longitudinal axis such that each plate of the plurality of plates is coupled to at least one shaft of the plurality of secondary shafts, wherein each secondary shaft of the plurality of secondary shafts is adapted to rotate upon rotation of corresponding plate of the plurality of plates.

3. The drive mechanism of claim 2, further comprising a plurality of secondary sprockets such that each secondary sprocket of the plurality of secondary sprockets is coupled to corresponding secondary shaft of the plurality of secondary shafts.

4. The drive mechanism of claim 3, wherein each secondary sprocket of the plurality of secondary sprockets is adapted to rotate upon rotation of corresponding secondary shaft of the plurality of secondary shafts.

5. The drive mechanism of claim 3, further comprising a plurality of rods such that each rod of the plurality of rods extends along the longitudinal axis and arranged in a parallel configuration with the primary shaft and the plurality of secondary shafts.

6. The drive mechanism of claim 5, further comprising a plurality of rod bearings such that each rod bearing of the plurality of rod bearings is coupled to the corresponding rod of the plurality of rods, wherein each rod bearing of the plurality of rod bearings facilitates rotation of corresponding rod of the plurality of rods.

7. The drive mechanism of claim 5, further comprising:

a plurality of rod sprockets such that each rod sprocket of the plurality of rod sprockets is coupled to corresponding rod of the plurality of rods; and a plurality of secondary chains such that each secondary chain of the plurality of secondary chains is wrapped around corresponding pair of the secondary sprocket of the plurality of secondary sprockets and the rod sprocket of the plurality of rod sprockets.

8. The drive mechanism of claim 7, wherein each secondary chain of the plurality of secondary chains facilitates rotation of a rod of the plurality of rods upon rotation of corresponding secondary sprocket of the plurality of secondary sprockets.

9. The drive mechanism of claim 1, wherein the motor unit further comprising a drive sprocket coupled to the motor shaft such that the drive sprocket rotates upon rotation of the motor shaft.

10. The drive mechanism of claim 9, further comprising:

a primary sprocket coupled to the primary shaft; and a primary chain drivingly wrapped around the drive sprocket and the primary sprocket such that the primary chain transmits the rotational force from the motor shaft to the primary shaft to rotate the primary shaft.

11. A display unit comprising:

a drive mechanism comprising:

a motor unit having a motor shaft such that the motor unit generates a rotational force to rotate the motor shaft;

a primary shaft that is coupled to the motor unit, and extends along a longitudinal axis of the drive mechanism such that the primary shaft rotates upon rotation of the motor shaft;

a drive piece that is coupled to the primary shaft such that the drive piece rotates upon rotation of the primary shaft, the drive piece comprising:

a plurality of pins disposed on a surface of the drive piece such that each pin of the plurality of pins extends in a direction of the longitudinal axis, wherein the plurality of pins revolves around the primary shaft upon rotation of the drive piece, wherein the plurality of pins are disposed on a plurality of locations of the surface of the drive piece to facilitate different combinations of revolutions of the plurality of pins around the primary shaft;

a plurality of plates disposed around the primary shaft, each plate of the plurality of plates comprising:

a plurality of channels formed on a surface of each plate of the plurality of plates such that each pin of the plurality of pins, upon revolution, intermittently engages with each channel of the plurality of channels of each plate of the plurality of plates, wherein each plate of the plurality of plates exhibits rotation upon an intermittent engagement of a pin of the plurality of pins with a channel of the plurality of channels of respective plate of the plurality of plates.

12. The display unit of claim 11, wherein the drive mechanism further comprising a plurality of secondary shafts that are disposed around the primary shaft, and extends along the longitudinal axis such that each plate of the plurality of plates is coupled to at least one shaft of the plurality of secondary shafts, wherein each secondary shaft of the plurality of secondary shafts is adapted to rotate upon rotation of corresponding plate of the plurality of plates.

13. The display unit of claim 12, wherein the drive mechanism further comprising a plurality of secondary sprockets such that each secondary sprocket of the plurality of secondary sprockets is coupled to corresponding secondary shaft of the plurality of secondary shafts.

14. The display unit of claim 13, wherein each secondary sprocket of the plurality of secondary sprockets is adapted to rotate upon rotation of corresponding secondary shaft of the plurality of secondary shafts.

15. The display unit of claim 13, wherein the drive mechanism further comprising a plurality of rods such that each rod of the plurality of rods extends along the longitudinal axis and arranged in a parallel configuration with the primary shaft and the plurality of secondary shafts.

16. The display unit of claim 15, wherein the drive mechanism further comprising:

a plurality of rod sprockets such that each rod sprocket of the plurality of rod sprockets is coupled to corresponding rod of the plurality of rods; and a plurality of secondary chains such that each secondary chain of the plurality of secondary chains is wrapped around corresponding pair of the secondary sprocket of the plurality of secondary sprockets and the rod sprocket of the plurality of rod sprockets.

17. The display unit of claim 16, wherein each secondary chain of the plurality of secondary chains facilitates rotation of a rod of the plurality of rods upon rotation of corresponding secondary sprocket of the plurality of secondary sprockets.

18. The display unit of claim 15, wherein the drive mechanism further comprising a plurality of rod bearings such that each rod bearing of the plurality of rod bearings is coupled to the corresponding rod of the plurality of rods, wherein each rod bearing of the plurality of rod bearings facilitates rotation of corresponding rod of the plurality of rods.

19. The display unit of claim 11, wherein the motor unit further comprising a drive sprocket coupled to the motor shaft such that the drive sprocket rotates upon rotation of the motor shaft.

20. The display unit of claim 19, wherein the drive mechanism further comprising:

a primary sprocket coupled to the primary shaft; and a primary chain drivingly wrapped around the drive sprocket and the primary sprocket such that the primary chain transmits the rotational force from the motor shaft to the primary shaft to rotate the primary shaft.

\*　\*　\*　\*　\*